US006674489B1

(12) United States Patent
Kagawa et al.

(10) Patent No.: US 6,674,489 B1
(45) Date of Patent: Jan. 6, 2004

(54) IMAGE DISPLAY PERFORMING COLOR REPRODUCTION USING COLOR FILTERS

(75) Inventors: Shuichi Kagawa, Tokyo (JP); Hiroaki Sugiura, Tokyo (JP); Kohei Teramoto, Tokyo (JP); Shinsuke Shikama, Tokyo (JP); Yoshiteru Suzuki, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/369,310

(22) Filed: Aug. 6, 1999

(30) Foreign Application Priority Data

Mar. 4, 1999 (JP) .......................................... P11-057747

(51) Int. Cl.[7] .............................. H04N 9/12; G02B 5/30
(52) U.S. Cl. ....................... 348/743; 348/655; 348/835; 359/502
(58) Field of Search .............................. 348/68, 69, 70, 348/655, 658, 742, 743, 835, 740; 359/502; H04N 9/12; G02B 5/30

(56) References Cited

U.S. PATENT DOCUMENTS

| 4,003,081 A | * | 1/1977 | Hilsum et al. ............... 348/817 |
| 5,448,314 A | * | 9/1995 | Heimbuch et al. ........... 348/270 |
| 5,642,197 A | * | 6/1997 | Tuhro et al. ................. 356/418 |
| 5,706,061 A | * | 1/1998 | Marshall et al. ............. 348/743 |
| 5,802,222 A | * | 9/1998 | Rasch et al. .................... 385/1 |
| 5,917,558 A | * | 6/1999 | Stanton ....................... 348/742 |
| 6,084,235 A | * | 7/2000 | Breithaupt et al. .......... 250/226 |
| 6,310,650 B1 | * | 10/2001 | Johnson et al. .............. 348/189 |
| 6,324,006 B1 | * | 11/2001 | Morgan ....................... 348/742 |
| 6,392,717 B1 | * | 5/2002 | Kunzman .................... 348/655 |

* cited by examiner

*Primary Examiner*—John Miller
*Assistant Examiner*—Brian Yenke
(74) *Attorney, Agent, or Firm*—Birch, Stewart, Kolasch & Birch, LLP

(57) ABSTRACT

In an image display which reproduces a color image by using lights color-separated into four or more colors through color filters, the objects of the invention are to effectively utilize the energy of light from a light source and to reduce the effect that a slight shift of the spectral transmittance characteristics of the color filters exerts on the spectral distributions of the lights after color separated. In an image display having a light source and four or more kinds of color filters and for color-separating light emitted from the light source into four or more colors through the four or more kinds of color filters and reproducing a color image by using the color-separated lights, the spectral transmittance characteristics of the color filters are set so that the cutoff wavelengths of the four or more kinds of color filters exist in a wavelength region in which the spectral distributions obtained by multiplying the spectral emissivity characteristic of the light emitted from the light source by the color matching functions are smaller than the values obtained by multiplying the average values of the spectral distributions in the wavelength region from 380 to 780 nm by an integer.

11 Claims, 27 Drawing Sheets

IMAGE DISPLAY PERFORMING COLOR REPRODUCTION USING COLOR FILTERS

BACKGROUND OF THE INVENTION

1. Field of the Invention

The present invention relates to an image display, and particularly to an image display which performs color reproduction by using color filters.

2. Description of the Background Art

Recently, many displays which reproduce color images by separating light from a light source into N kinds of colors by using color filters and projecting the lights separated into N colors onto a screen are appearing. The number N is a positive integer. Usually N is equal to three, and lights separated into three colors of red, green and blue (hereinafter referred to as R, G, B) through color filters are projected to reproduce a color image.

The displays which reproduce color images by using lights color-separated by filters are roughly classified into two types according to structure. One is the time-division color projection system and the other is the simultaneous color projection system. The time-division color projection system and the simultaneous color projection system will now be described about a structure in which lights separated into the three colors R, G, B through color filters are projected to reproduce a color image.

In the time-division color projection system, lights separated into N kinds of colors through color filters are projected in order in a time-division manner within a single image frame to reproduce a color image. When reproducing a color image by projecting lights separated into the three colors R, G, B through color filters, the lights separated into R, G, and B are projected in order in a time-division manner to reproduce a color image.

In the simultaneous color projection system, lights separated into N kinds of colors through color filters are simultaneously projected to reproduce a color image. For example, when reproducing a color image by projecting lights separated into the three colors R, G, B, the lights separated into R, G, B through color filters are simultaneously projected to reproduce a color image.

FIG. 15 is a diagram showing an example of a color image display of the time-division color projection system using a light valve. The light valve is an element for modulating light, which may be a DMD, liquid crystal, etc. As shown in FIG. 15, the time-division color projection system color image display has a light source 101, a color disk 102, a light valve 103, a screen 104, and a signal processing unit 105. The color image display of FIG. 15 reproduces a color image by projecting lights separated into the three colors R, G, B.

The operation of the time-division color projection system will now be described referring to FIG. 15. Image data is inputted to the signal processing unit 105. The signal processing unit 105 generates control signals for the color disk 102 and the light valve 103 from the input image data and supplies the control signals to the color disk 102 and the light valve 103.

The light emitted from the light source 101 enters a part of the color disk 102. The color disk 102 is divided into three areas: a filter transmitting red (R) light, a filter transmitting green (G) light, and a filter transmitting blue (B) light. The color disk 102 is rotating while controlled by the control signal from the signal processing unit 105 and the filter located in the position the light from the light source 101 strikes is changed in a time-division manner. Thus the light from the light source 101 is color-separated into R, G, B lights in a time-division manner by the color disk 102. The lights color-separated into R, G, and B lights at the color disk 102 in a time division manner impinge on the light valve 103.

The R, G, and B lights incident upon the light valve 103 are modulated by the light valve 103 according to the control signal from the signal processing unit 105 and projected onto the screen 104.

Next, the simultaneous color projection system will be described. FIG. 16 is a diagram showing an example of a color image display of the simultaneous color projection system using a light valve. As shown in FIG. 16, the simultaneous color projection system color image display has light sources 101a to 101c, light valves 103a to 103c, a screen 104, a signal processing unit 105, a filter transmitting red light 106a, a filter transmitting green light 106b, and a filter transmitting blue light 106c. The color image display of FIG. 16 reproduces a color image by projecting the lights separated into the three colors R, G, B.

The operation of the simultaneous color projection system will now be described referring to FIG. 16. Image data is inputted to the signal processing unit 105. The signal processing unit 105 generates control signals for the light valves 103a to 103c from the input image data and supplies the control signals to the light valves 103a to 103c.

The light emitted from the light source 101a enters the color filter 106a. The color filter 106a has a property of transmitting red light, and the light from the light source 101a is color-separated to R light at the color filter 106a. The R light color-separated at the color filter 106a impinges upon the light valve 103a.

Similarly, the light from the light 101b is color-separated to G light at the color filter 106b and impinges upon the light valve 103b. The light from the light source 101c is color-separated to B light at the color filter 106c and impinges upon the light valve 103c.

The R, G, and B lights incident upon the light valves 103a, 103b, and 103c are modulated at the light valves 103a, 103b and 103c according to the control signals from the signal processing unit 105 and projected onto the screen 104.

As described above, a display which color-separates light from light source using color filters and reproduces a color image using the color-separated lights can be realized by the time-division color projection system or the simultaneous color projection system. The two systems are common in that they color-separate the light emitted from the light source through color filters.

Now a color image display which reproduces a color image with lights generally separated into N colors will be considered. The spectral emissivity of the light emitted from the light source is shown as $E(\lambda)$ and the spectral transmittances of the N color filters for color-separating the light from the light source are shown as $fi(\lambda)$. Where i=1, 2, . . . , N. In this case, the spectral distributions $ci(\lambda)$ of the N-color lights Ci color-separated by the N color filters can be expressed by equation (1) below.

$$ci(\lambda) = E(\lambda) \times fi(\lambda) \qquad \text{Eq.(1)}$$

From equation (1), the spectral distributions $ci(\lambda)$ of the lights Ci separated into N colors are represented as the product of the spectral emissivity $E(\lambda)$ of the light emitted from the light source and the spectral transmittance $fi(\lambda)$ of the color filters. Accordingly, to efficiently utilize the light emitted from the light source, the characteristic of the spectral emissivity $E(\lambda)$ of the light emitted from the light source must be taken into consideration when determining the spectral transmittances $fi(\lambda)$ of the color filters.

Now suppose a light source S having such spectral emissivity as shown in FIG. 17. In FIG. 17, the vertical axis shows the relative intensity of light emitted from the light source and the horizontal axis shows the wavelength. The spectral emissivity of the light source S shown in FIG. 17 has intensive radiations in the two wavelength regions a and b. Such a spectral emissivity characteristic as has intensive radiations at particular wavelengths is shown by a super high pressure mercury lamp, a xenon lamp, etc.

Now we consider the color separation of light from a light source S through color filters. FIG. 18 is a diagram showing an example of spectral transmittance characteristic of a color filter F used in the color separation. FIG. 18 shows the spectral transmittance characteristic of the color filter F by the solid line and the spectral emissivity of the light source S by the broken line. In FIG. 18, the vertical axis shows the transmittance of the filter or the relative intensity of the light and the horizontal axis shows the wavelength.

FIG. 19 is a diagram showing the spectral distribution characteristic of the light Ci obtained when the light from the light source S is color-separated through the color filter F. FIG. 19 shows that the two intensive radiations of the spectral emissivity of the light source S are not sufficiently transmitted when the light from the light source S is color-separated by the color filter F. This means the fact that the energy of the light emitted from the light source S is not sufficiently utilized. This is because the cutoff wavelengths of the color filter F are in the vicinities of the intensive radiations in the spectral emissivity.

Next, a more specific example will be considered. Suppose that a super high pressure mercury lamp is used as the light source S and a color image is reproduced by projecting lights separated into three colors R, G, B. FIG. 20 shows an example of spectral emissivity $Eu(\lambda)$ of the super high pressure mercury lamp. In FIG. 20, the vertical axis shows the relative intensity of the light emitted from the light source and the horizontal axis shows the wavelength. FIG. 20 shows that the spectral emissivity $Eu(\lambda)$ of the super high pressure mercury lamp has intensive radiations at some wavelengths.

FIG. 21 shows an example of spectral transmittance characteristics $f1i(\lambda)$ of three color filters used in the color image display. Where i=1 to 3. In FIG. 21, the vertical axis shows the transmittance of the filters and the horizontal axis shows the wavelength. In this case, the spectral distribution $c1i(\lambda)$ of the three-color light C1i color-separated by the three color filters can be calculated by the equation (2) below.

$$c1i(\lambda)=Eu(\lambda) \times f1i(\lambda) \qquad \text{Eq.(2)}$$

FIG. 22 shows the spectral distributions $c1i(\lambda)$ of the three-color lights C1i color-separated by the color filters. In FIG. 22, the vertical axis shows the relative intensity of the color-separated lights, and the horizontal axis shows the wavelength. The tristimulus values X1i, Y1i, Z1i of the color-separated three-color lights Ci can be obtained by performing the calculation of equation (3) by using $c1i(\lambda)$ obtained from equation (2). In equation (2), $(\lambda)$, $(\lambda)$, $(\lambda)$ show the color matching function.

$$X1i=\int c1i(\lambda)\times\bar{x}(\lambda)d\lambda=\int Eu(\lambda)\times f1i(\lambda)\times\bar{x}(\lambda)d\lambda$$

$$Y1i=\int c1i(\lambda)\times\bar{y}(\lambda)d\lambda=\int Eu(\lambda)\times f1i(\lambda)\times\bar{y}(\lambda)d\lambda$$

$$Z1i=\int c1i(\lambda)\times\bar{z}(\lambda)d\lambda=\int Eu(\lambda)\times f1i(\lambda)\times\bar{z}(\lambda)d\lambda \qquad \text{Eq.(3)}$$

Further, with the x1i and y1i values obtained by performing the calculation of equation (4) using the tristimulus values X1i, Y1i, Z1i obtained by equation (3), the color-separated three-color lights C1i can be represented on a chromaticity diagram. The chromaticity diagram shows colors as points on plane coordinates.

$$x1i = \frac{X1i}{X1i+Y1i+Z1i}$$

$$y1i = \frac{Y1i}{X1i+Y1i+Z1i} \qquad \text{Eq.(4)}$$

FIG. 23 shows the three-color lights C1i color-separated through the color filters on a chromaticity diagram. In FIG. 23, the inside of the triangle defined by the three points C11, C12, C13 corresponds to the coordinates of colors reproducible with the three-color lights C1i. Thus, in a color image display using a super high pressure mercury lamp as a light source and performing color separation with three color filters having the spectral transmittance characteristics shown in FIG. 21, the range of reproducible colors corresponds to the inside of the triangle defined by the three points C11, C12, C13 on FIG. 23.

Recently, multi-band image displays are studied in which a color image is reproduced by using lights separated into more than three colors. The multi-band image display is advantageous in that the range of reproducible colors can be expanded as compared with a conventional three-color image display.

Reproduction of a color image with lights separated into six colors will now be considered as an example of the multi-band image display. Six color filters used to color-separate the light from a light source may have such spectral transmittance characteristics as almost equally divide the wavelength region of 400 to 700 nm into six. FIG. 24 shows an example of the spectral transmittance characteristics $f2j(\lambda)$ of the six color filters. Where j=1 to 6. In FIG. 24, the vertical axis shows the transmittance of the filters and the horizontal axis shows the wavelength.

Suppose that a super high pressure mercury lamp is used again as the light source. FIG. 25 shows the spectral distributions $c2j(\lambda)$ of the six-color lights C2j color-separated by the color filters. The spectral distributions $c2j(\lambda)$ can be given by the calculation of equation (5). In FIG. 25, the vertical axis shows the relative intensity of the color-separated lights and the horizontal axis shows the wavelength.

$$c2j(\lambda)=Eu(\lambda) \times f2j(\lambda) \qquad \text{Eq.(5)}$$

The tristimulus values X2j, Y2j, Z2j of the color-separated six-color lights C2j can be obtained by performing the calculation of equation (6) by using $c2j(\lambda)$. Further, with the x2j and y2j values obtained by performing the calculation of equation (7) by using the tristimulus values X2j, Y2j, Z2j, the color-separated six-color lights C2j can be represented on a chromaticity diagram.

$$X2j=\int c2j(\lambda)\times\bar{x}(\lambda)d\lambda=\int Eu(\lambda)\times f2j(\lambda)\times\bar{x}(\lambda)d\lambda$$

$$Y2j=\int c2j(\lambda)\times\bar{y}(\lambda)d\lambda=\int Eu(\lambda)\times f2j(\lambda)\times\bar{y}(\lambda)d\lambda$$

$$Z2j=\int c2j(\lambda)\times\bar{z}(\lambda)d\lambda=\int Eu(\lambda)\times f2j(\lambda)\times\bar{z}(\lambda)d\lambda \qquad \text{Eq.(6)}$$

$$x2j = \frac{X2j}{X2j + Y2j + Z2j} \qquad \text{Eq.(7)}$$

$$y2j = \frac{Y2j}{X2j + Y2j + Z2j}$$

FIG. 26 represents the six-color lights C2j color-separated by the color filters on a chromaticity diagram. In FIG. 26, the interior of the hexagon defined by the six points C21 to C26 correspond to the coordinates of colors reproducible by the six-color lights C2j. Accordingly, in a color image display using a super high pressure mercury lamp as a light source and performing color separation with six color filters having the spectral transmittance characteristics shown in FIG. 24, the range of reproducible colors corresponds to the interior of the hexagon defined by the six points C21 to C26 in FIG. 26.

The triangle shown by the broken line in FIG. 26 is the range of colors reproducible in the color image display using a super high pressure mercury lamp as a light source and performing color separation with three color filters having the spectral transmittance characteristics shown in FIG. 21. FIG. 26 shows that the color image display using six color filters having the spectral transmittance characteristics shown in FIG. 24 can reproduce a wider range of colors as compared with the color image display using three color filters having the spectral transmittance characteristics shown in FIG. 21.

Now we consider the relation between the spectral transmittance characteristics of the six color filters shown in FIG. 24 and the spectral emissivity characteristic of the super high pressure mercury lamp shown in FIG. 20. In the spectral transmittance characteristics of the six color filters, $f23(\lambda)$ and $f24(\lambda)$ have cutoff wavelengths in the vicinity of the wavelength 550 nm. On the other hand, the spectral emissivity characteristic of the super high pressure mercury lamp has intensive radiation in the vicinity of the wavelength 550 nm.

From this relation, the intensive radiation around the wavelength 550 nm of the spectral emissivity characteristic of the super high pressure mercury lamp is largely cut by the color filters. Accordingly it cannot be said that the six color filters having the spectral transmittance characteristics shown in FIG. 24 effectively utilize the light energy emitted from the super high pressure mercury lamp having the spectral emissivity characteristic shown in FIG. 20.

Further, the spectral transmittance characteristics of the color filters sharply change in the vicinities of the cutoff wavelengths. Hence, when the cutoff wavelength of the spectral transmittance characteristic of a color filter is in a wavelength region in which the spectral emissivity characteristic of the light source presents intensive radiation, a slight shift of the spectral transmittance characteristic of the color filter appears as a significant difference in the spectral distribution of the color-separated light.

As stated above, depending on the relation between the spectral emissivity characteristic of the light from the light source and the spectral transmittance characteristics of color filters used for color separation, a display reproducing a color image by using lights color-separated by the color filters cannot sufficiently utilize the light energy from the light source, and a slight shift of the spectral transmittance characteristics of the color filters appears as a significant difference in the spectral distribution of the lights after color-separated.

This problem is especially serious in a display which reproduces a color image using lights color-separated into four or more colors through color filters.

A conventional image display reproducing a color image by using lights color-separated by color filters into four or more colors has the problem that it cannot sufficiently utilize the energy of light from the light source used therein, depending on the relation between the spectral emissivity characteristic of the light from the light source and the spectral transmittance characteristics of the color filters used for color separation. It also has the problem that a slight shift of the spectral transmittance characteristics of the color filters appears as a significant difference in the spectral distributions of the lights after color-separated, depending on the relation between the spectral emissivity characteristic of the light from the light source used therein and the spectral transmittance characteristics of the color filters used for color separation.

SUMMARY OF THE INVENTION

A first aspect of the present invention is directed to an image display having a light source and a color filter and color-separating light emitted from the light source through the color filter to reproduce a color image by using the color-separated light, wherein the color filter has its cutoff wavelength in a wavelength region in which a spectral distribution obtained by multiplying the spectral emissivity characteristic of the light emitted from the light source by a color matching function is smaller than a predetermined threshold, which enables effective use of the energy of the light emitted from the light source and alleviates the effect that a slight shift of the spectral transmittance characteristic of the color filter exerts on the spectral distribution of the light after color separation.

Preferably, in an image display of a second aspect, the color filter includes four or more kinds of color filters, and then the range of reproducible colors can be expanded while successfully solving the problems which become more serious as the number of kinds of the color filters increases, that is, the problem that the energy of the light from the light source cannot sufficiently be utilized and the problem that a slight shift of the spectral transmittance characteristics of the color filters appears as a significant difference in the spectral distributions of the lights after color separated.

Preferably, in an image display of a third aspect, the predetermined threshold is a value obtained by multiplying an average value of the spectral distribution in a predetermined wavelength region by a constant, and which is smaller than the maximum value of the spectral distribution in the predetermined wavelength region, and then the cutoff wavelengths can be selected in accordance with the number of kinds of the color filters by appropriately setting the constant, so that the energy of the light emitted from the light source can be utilized further effectively and the effect exerted by a slight shift of the spectral transmittance characteristic of the color filter on the spectral distribution of the light after color-separated can be further reduced.

Preferably, in an image display of a fourth aspect, the predetermined wavelength region is the wavelength region from 380 nm to 780 nm, and the cutoff wavelength can be selected in accordance with the wavelength region of 380 to 780 nm which corresponds to the visible region of human eyes, so that the energy of the light emitted from the light source can be utilized further effectively and the effect of a slight shift of the spectral transmittance characteristic of the color filter on the spectral distribution of the light after color separation can be further alleviated.

Preferably, in an image display of a fifth aspect, the constant is an integer, which facilitates the selection of the cutoff wavelength.

Preferably, in an image display of a sixth aspect, the light source is a super high pressure mercury lamp, and in an image display using a super high pressure mercury lamp as the light source, the energy of the light emitted from the super high pressure mercury lamp can be effectively used and the effect of a slight shift of the spectral transmittance characteristic of the color filter on the spectral distribution of the light after color separation can be reduced.

Preferably, in an image display of a seventh aspect, the light source is a metal halide lamp, and in an image display using a metal halide lamp as the light source, the energy of the light emitted from the metal halide lamp can be effectively used and the effect of a slight shift of the spectral transmittance characteristic of the color filter on the spectral distribution of the light after color separation can be reduced.

The present invention has been made to solve the above-described problems, and in a display for reproducing a color image by using lights color-separated into four or more colors through color filters, an object of the present invention is to determine spectral transmittance characteristics of the color filters used for color separation while taking into account the spectral emissivity characteristic of the light from the light source used therein, so as to effectively use the energy of the light from the light source and to alleviate the effect that a slight shift of the spectral transmittance characteristics of the color filters exerts on the spectral distributions of the lights after color separation.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
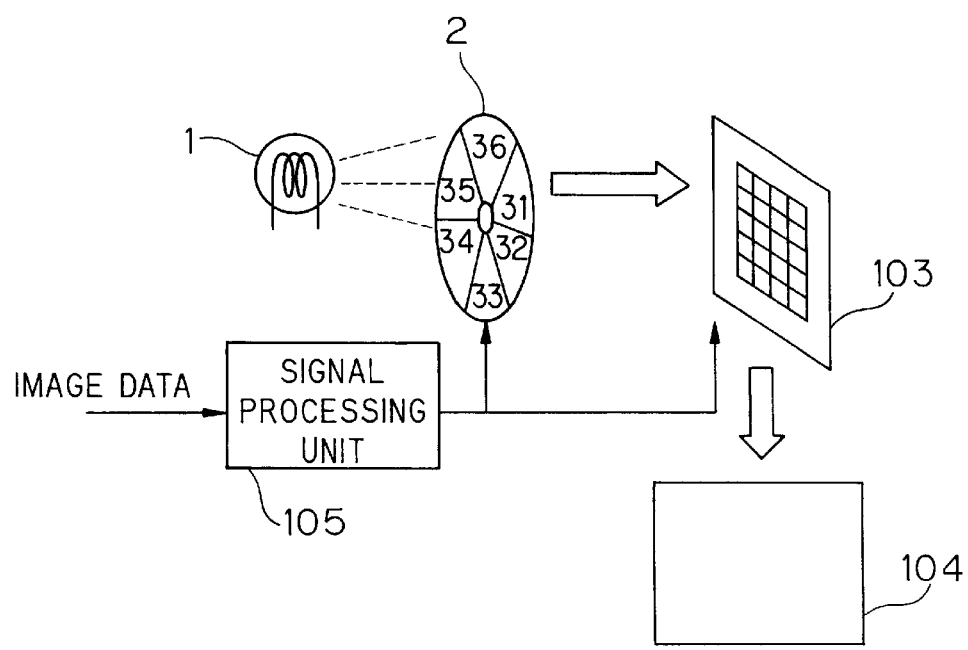
FIG. 1 is a block diagram showing an example of structure of an image display according to a first preferred embodiment of the present invention.

The present invention will now be described specifically referring to the drawings showing its preferred embodiments.

First Preferred Embodiment

FIG. 1 is a block diagram showing an example of structure of an image display of a preferred embodiment of the present invention. As shown in FIG. 1, the image display has a super high pressure mercury lamp 1, a color disk 2, a light valve 103, a screen 104, and a signal processing unit 105. The image display of FIG. 1 reproduces a color image by projecting lights separated into six colors C31, C32, C33, C34, C35 and C36 at color filters 31, 32, 33, 34, 35, and 36 of the color disk 2.

The operation of the image display of FIG. 1 will now be described. Image data is inputted to the signal processing unit 105. The signal processing unit 105 generates control signals for the color disk 2 and the light valve 103 from the input image data and supplies the control signals to the color disk 2 and the light valve 103.

Figure 20:
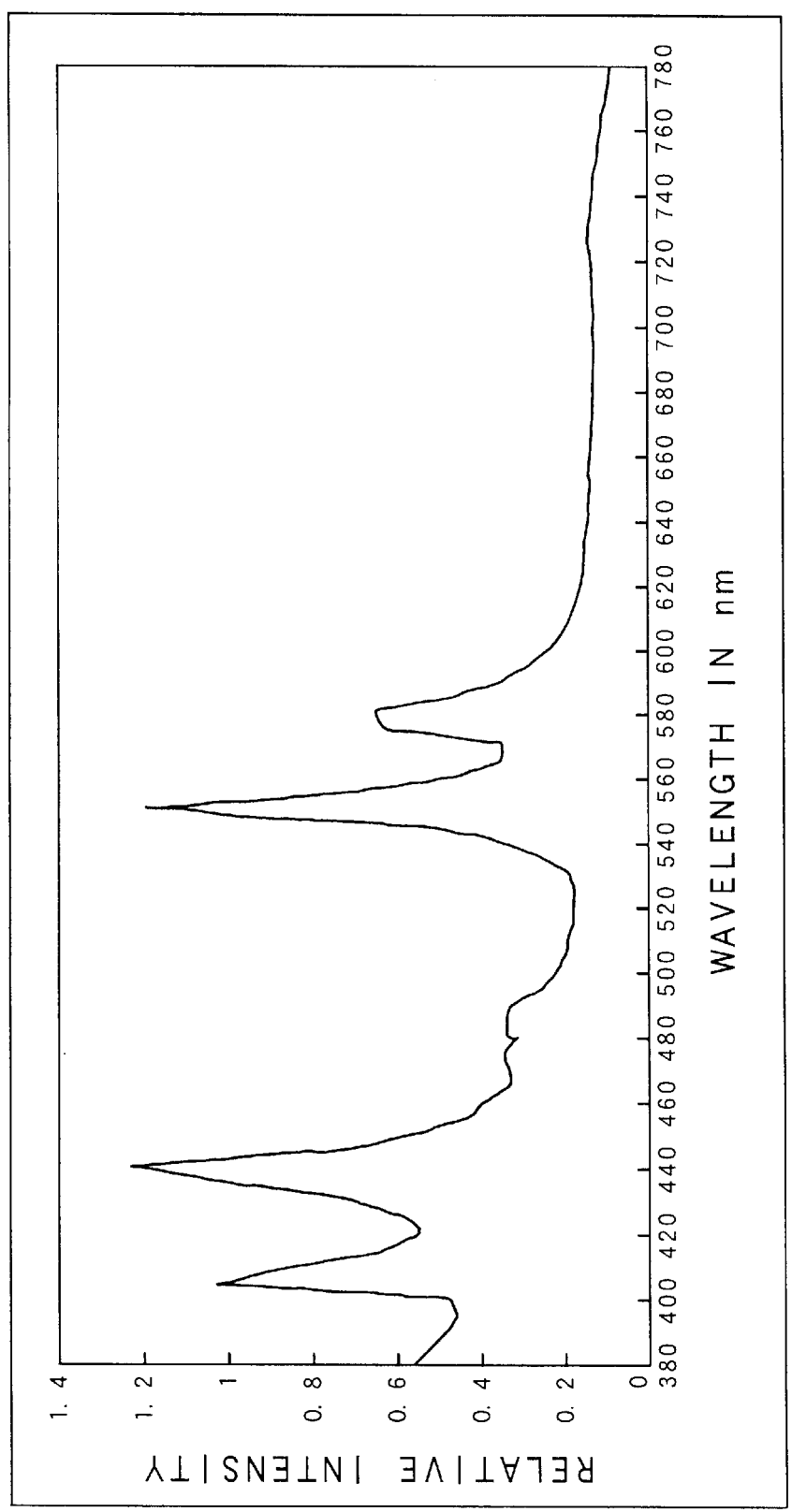
FIG. 20 is a diagram showing an example of the spectral emissivity of light emitted from a super high pressure mercury lamp.
Figure 21:
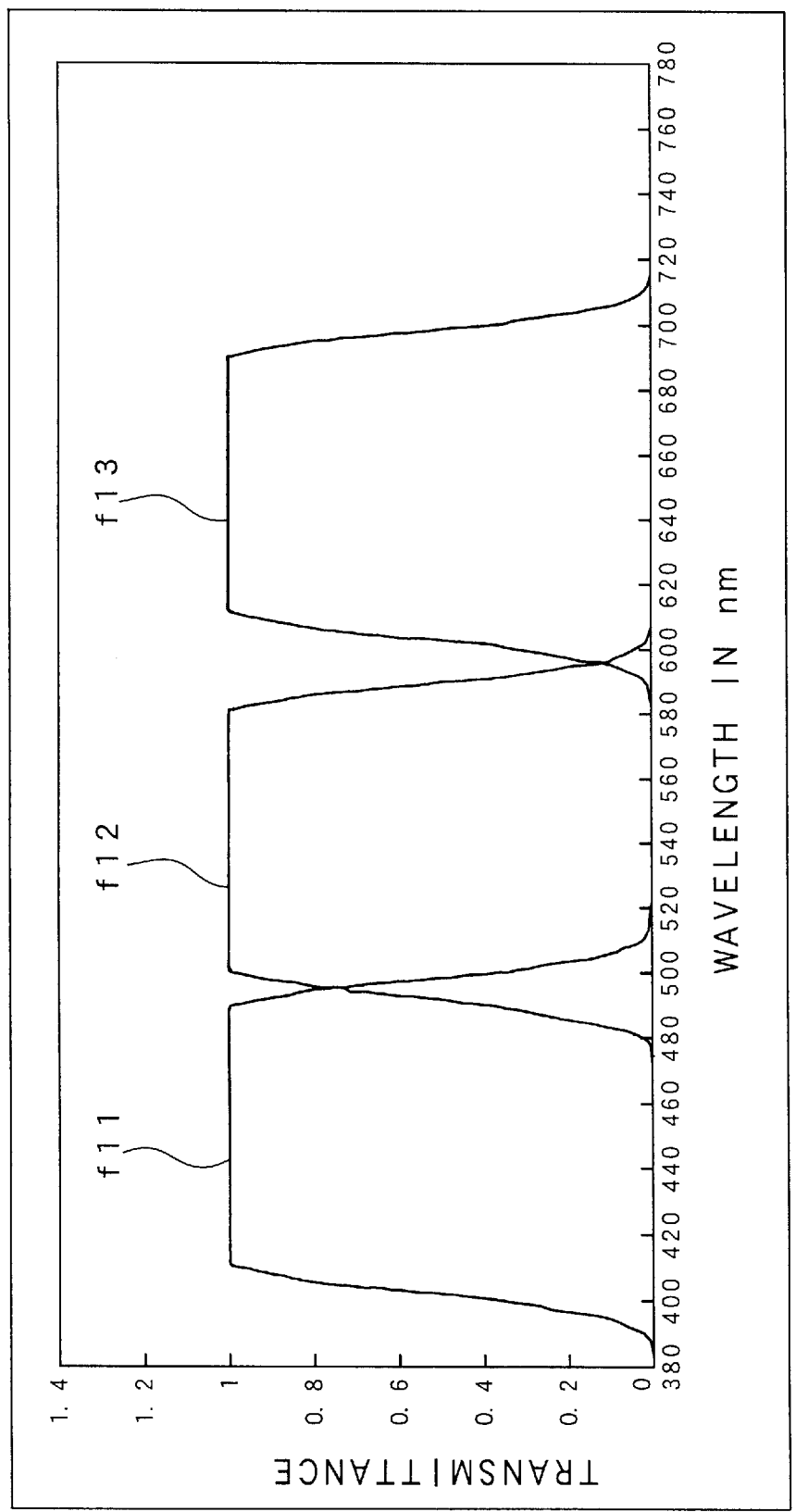
FIG. 21 is a diagram showing an example of spectral transmittance characteristics of three color filters used in a conventional image display.
Figure 22:
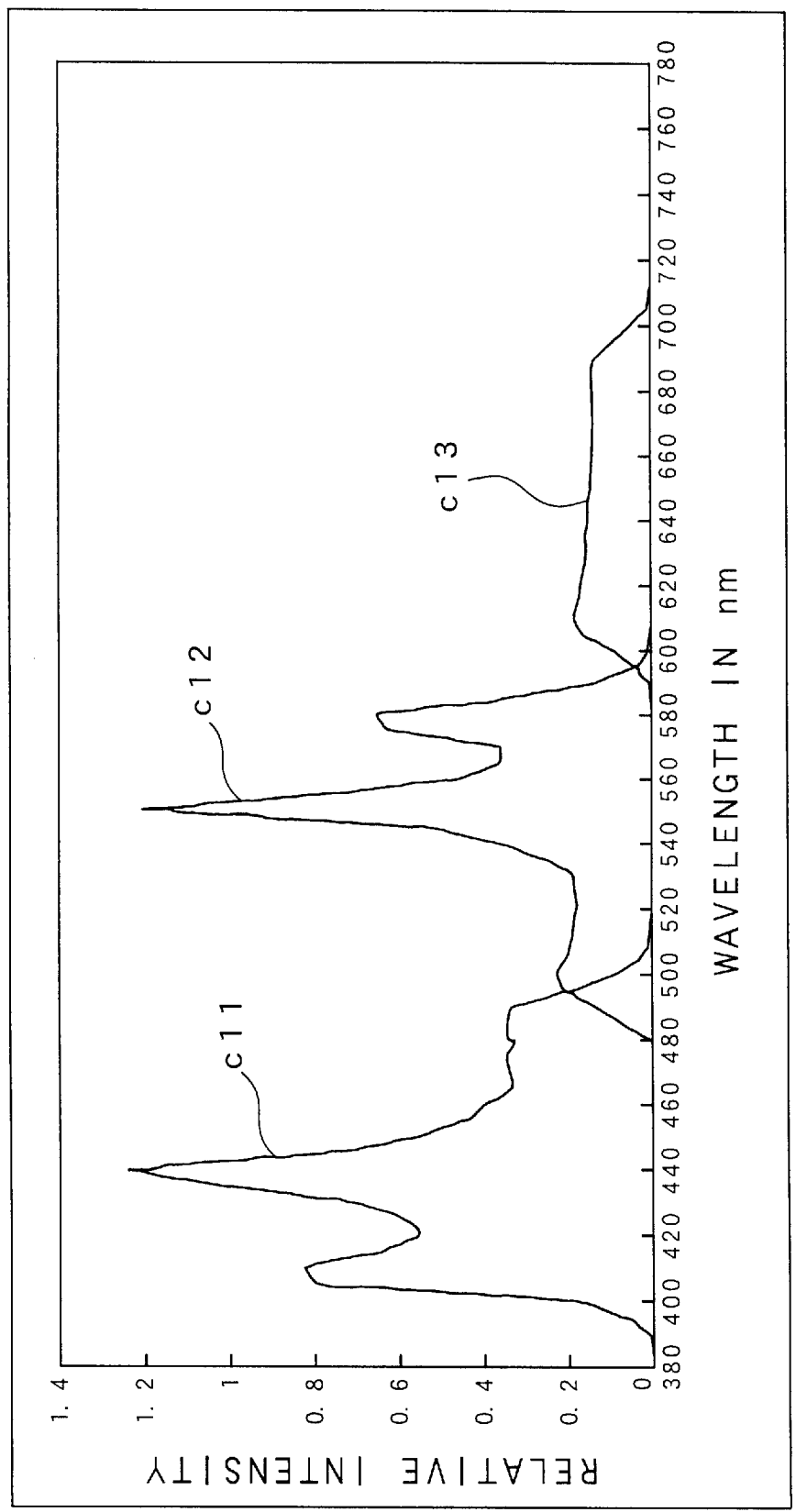
FIG. 22 is a diagram showing the spectral distribution characteristics of the lights of three colors color-separated through the three color filters in the conventional image display.
Figure 23:
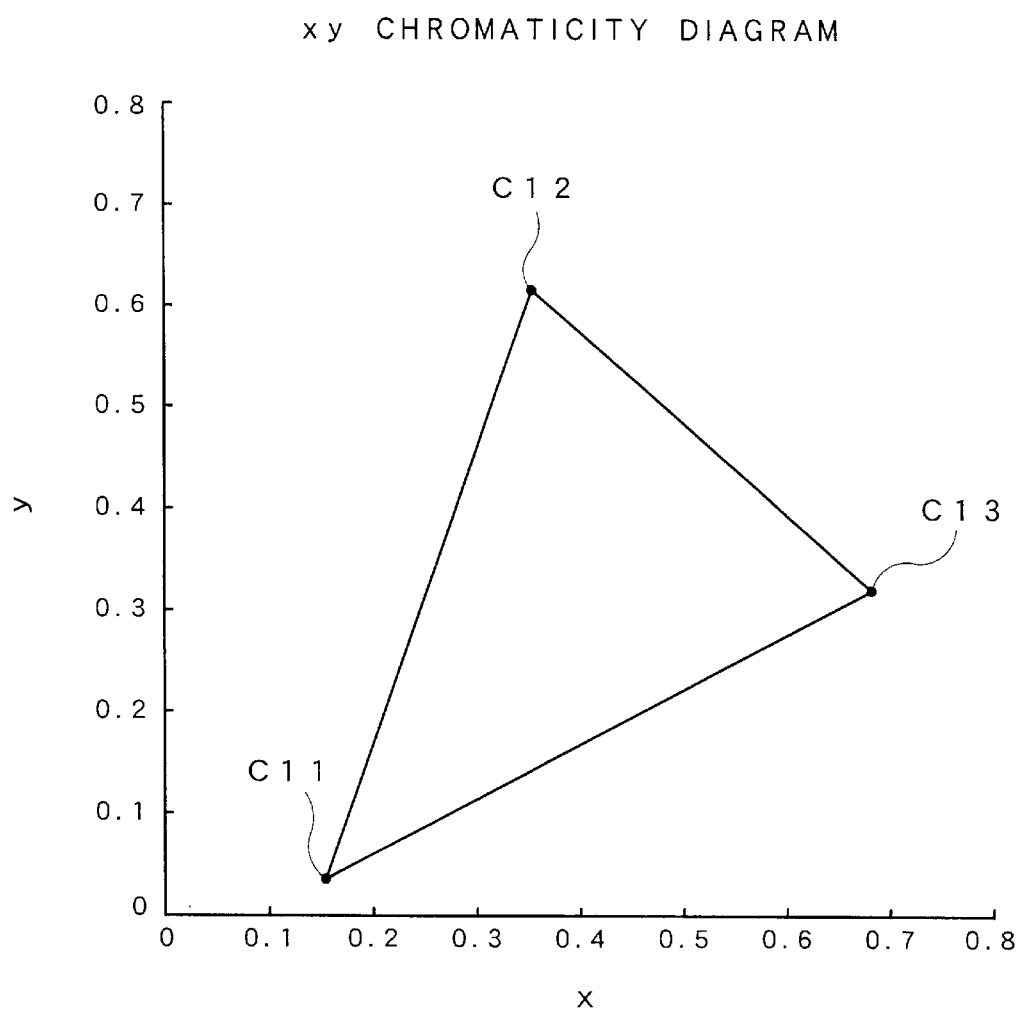
FIG. 23 is a diagram showing the three-color lights color-separated by the three color filters in the conventional image display on a chromaticity diagram.

The light emitted from the super high pressure mercury lamp 1 enters a part of the color disk 2. FIG. 20 shows an example of the spectral emissivity $Eu(\lambda)$ of the light emitted from the super high pressure mercury lamp 1. In FIG. 20, the vertical axis shows the relative intensity of the light emitted from the light source and the horizontal axis shows the wavelength.

Figure 2:
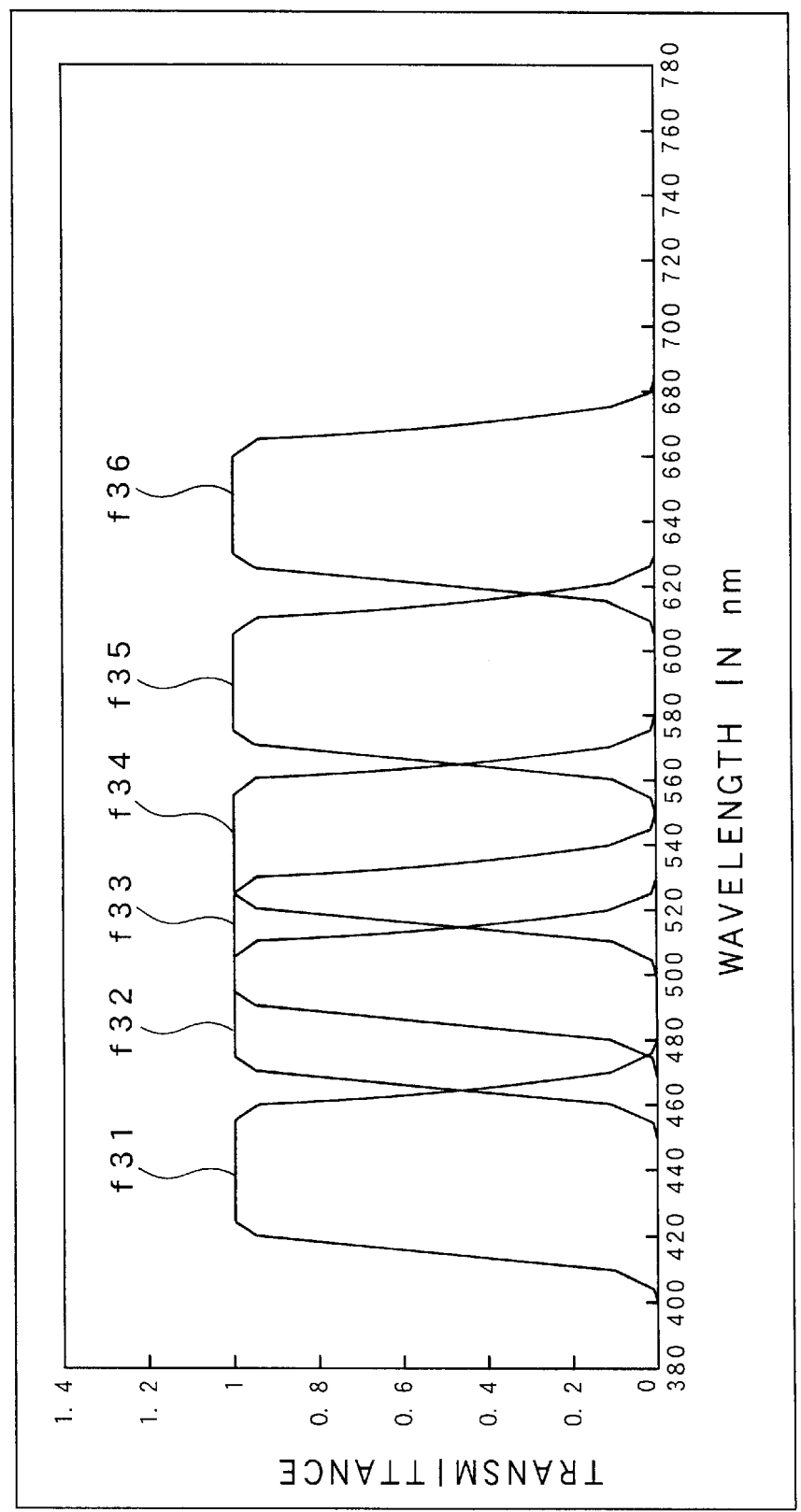
FIG. 2 is a diagram showing an example of spectral transmittance characteristics of six kinds of color filters used in the image display of the first preferred embodiment of the invention.

The color disk 2 is divided into six areas, each area 3j being a color filter having a spectral transmittance characteristic $f3j(\lambda)$. Where j=1 to 6. FIG. 2 shows an example of the spectral transmittance characteristics $f3j(\lambda)$ of the six kinds of color filters 3j used in the color image display of the first preferred embodiment of the invention. In FIG. 2, the vertical axis shows the transmittance of the filters and the horizontal axis shows the wavelength.

The spectral transmittance characteristics $f3j(\lambda)$ of the six kinds of color filters 3j used in the color image display of the first preferred embodiment of the invention are determined as follows.

The spectral emissivity characteristic of the light emitted from the super high pressure mercury lamp 1 shown in FIG. 20 has intensive radiations in the vicinities of the four wavelengths 405 nm, 440 nm, 550 nm, and 580 nm. Human eyes have highly sensitive wavelength region and less sensitive wavelength region. Considering this visual characteristic of human eyes, the spectral emissivity does not have to be equally handled in all wavelength regions of the light emitted from the light source. Accordingly, when determining the spectral transmittance characteristics of the color filters, the visual characteristic of human eyes is taken into consideration as well as the spectral emissivity characteristic of the light emitted from the super high pressure mercury lamp.

Figure 3A:
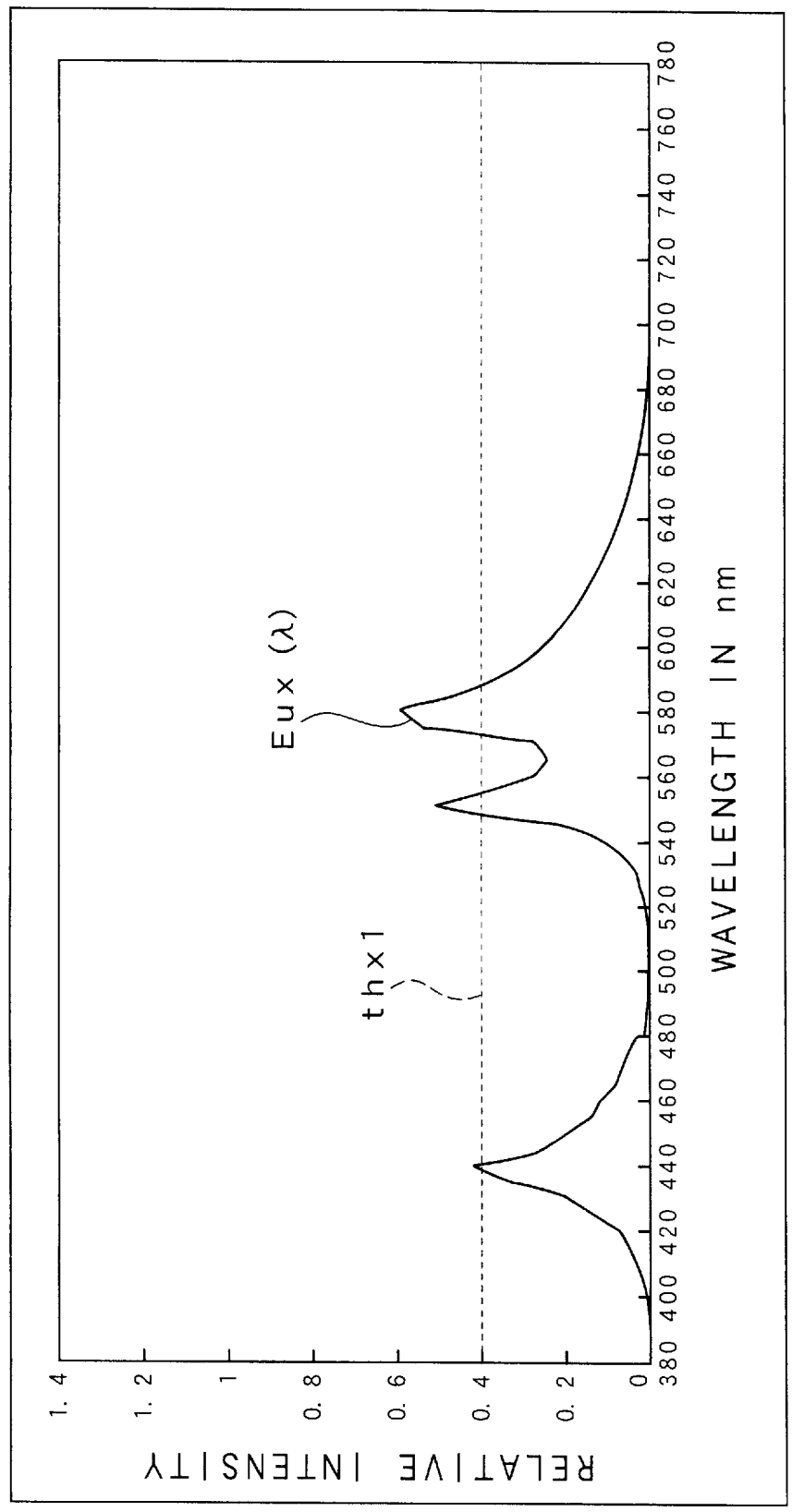
FIGS. 3A to 3C are diagrams showing spectral distribution characteristics obtained by multiplying the spectral emissivity of light from a super high pressure mercury lamp by color matching functions.
Figure 3B:
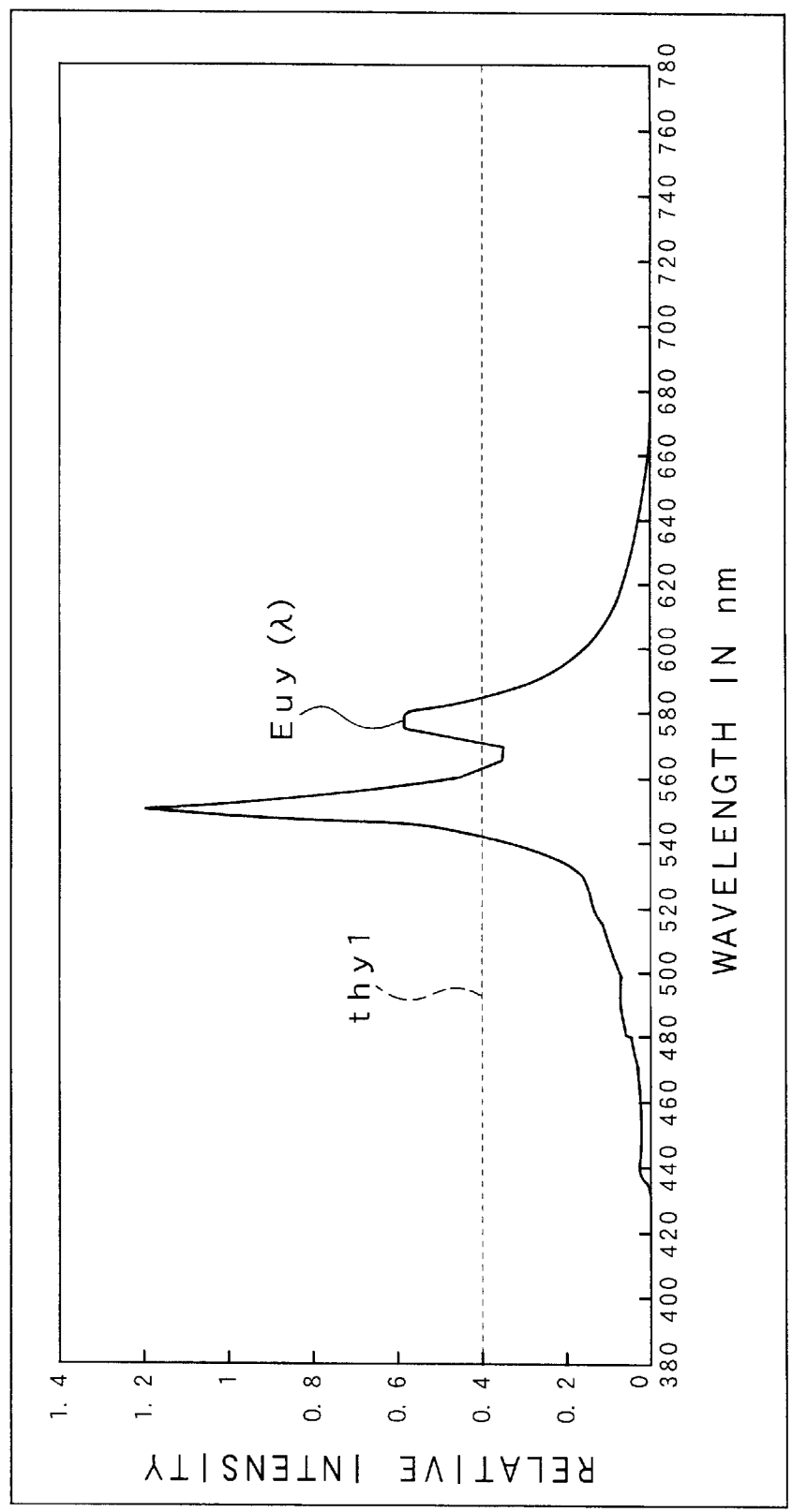
Figure 3C:
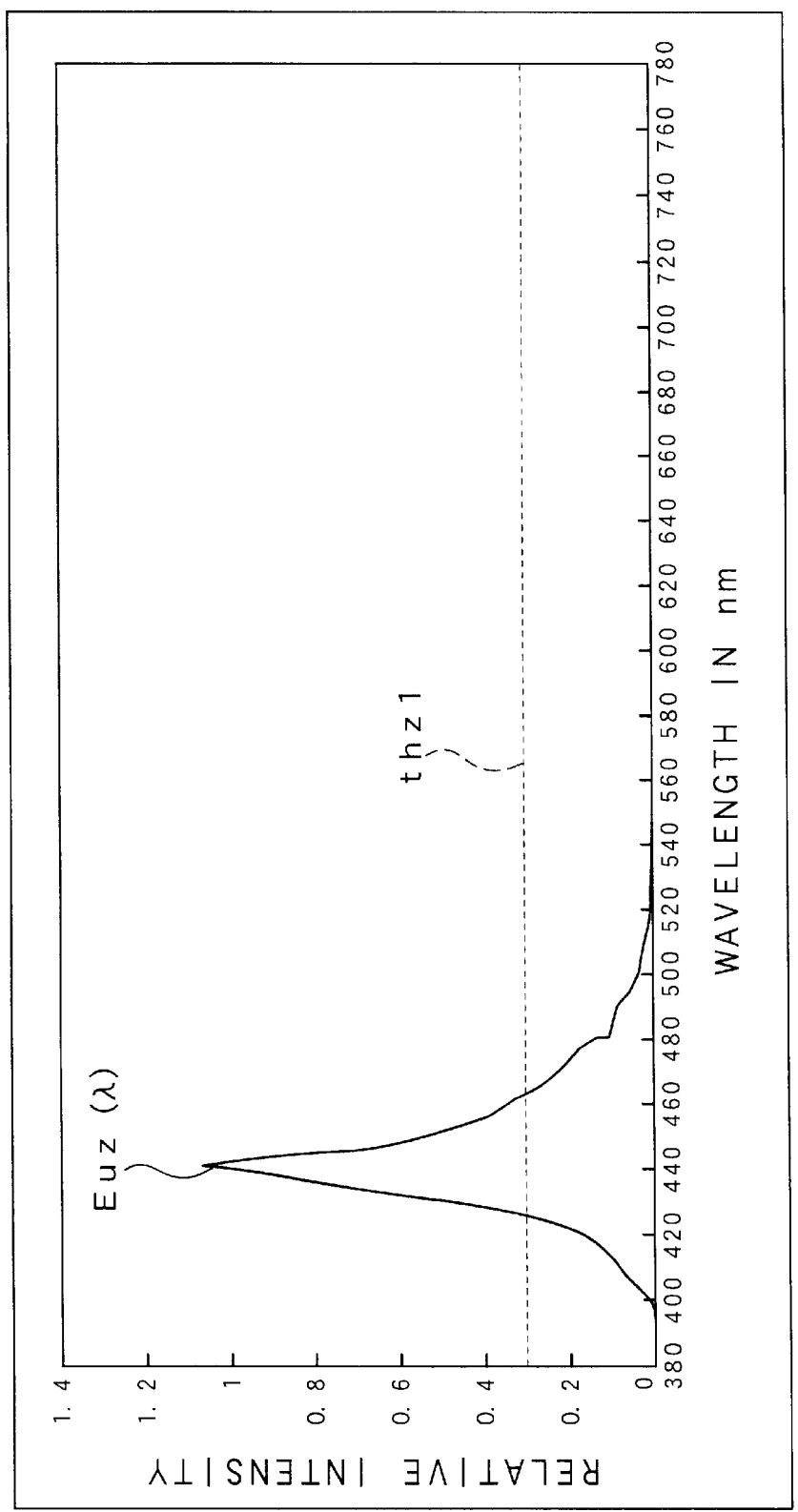

The solid lines in FIGS. 3A to 3C show the spectral distribution characteristics $Eux(\lambda)$, $Euy(\lambda)$ and $Euz(\lambda)$, which are obtained by multiplying the spectral emissivity $Eu(\lambda)$ of the light emitted from the super high pressure mercury lamp 1 by the color matching functions $\bar{x}(\lambda)$, $\bar{y}(\lambda)$, and $\bar{z}(\lambda)$. The broken lines in FIGS. 3A to 3C show the values of thx1, thy1, thz1 obtained by the calculation of equation (8).

$$thx1 = 4 \times \int_{380}^{780} Eu(\lambda) \times \bar{x}(\lambda)\, d\lambda / (780 - 380)$$

$$thy1 = 4 \times \int_{380}^{780} Eu(\lambda) \times \bar{y}(\lambda)\, d\lambda / (780 - 380)$$

$$thz1 = 4 \times \int_{380}^{780} Eu(\lambda) \times \bar{z}(\lambda)\, d\lambda / (780 - 380)$$

Eq.(8)

The values thx1, thy1, and thz1 given by the equation (8) are four times the average values of $Euz(\lambda)$, $Euy(\lambda)$, and $Euz(\lambda)$ in the wavelength range of 380 to 780 nm. In FIGS. 3A to 3C, the wavelengths at which $Eux(\lambda)$, $Euy(\lambda)$ and $Euz(\lambda)$ are respectively larger than thx1, thy1 and thz1 are determined to be wavelengths at which the spectral distribution of $Eux(\lambda)$, $Euy(\lambda)$, or $Euz(\lambda)$ is strong, and the wavelengths other than the strong spectral distribution wavelengths are determined to be wavelengths at which the spectral distributions are weak.

From FIGS. 3A to 3C, it is seen that the spectral distribution is strong in the vicinities of the three wavelengths 440 nm, 550 nm, and 580 nm in $Eux(\lambda)$, $Euy(\lambda)$, or $Euz(\lambda)$. The spectral transmittance characteristics $f3j(\lambda)$ of the six kinds of color filters 3j are determined while taking into account the wavelengths at which the spectral distributions are strong. Effectively utilizing the light energy from the super high pressure mercury lamp 1 requires that the wavelength regions in which the spectral distribution is strong be completely included in the transmission wavelength regions of the six kinds of color filters.

To alleviate the effect that a slight shift of the spectral transmittance characteristics of the color filters exerts on the spectral distributions of the lights after color-separated, it is preferred that the cutoff wavelengths of the six kinds of color filters are in the wavelength regions in which the spectral distributions are weak.

The spectral transmittance characteristics $f3j(\lambda)$ of the six kinds of color filters 3j are determined so that the wavelength regions in the vicinities of the wavelengths 440 nm, 550 nm, and 580 nm in which the spectral distributions are strong in the spectral distribution characteristics shown in FIGS. 3A to 3C are completely included in the transmission wavelength regions of the six kinds of color filters 31 to 36. Then the energy of the super high pressure mercury lamp 1 can be effectively utilized. The cutoff wavelengths of the six kinds of color filters 31 to 36 are set in wavelength regions in which the spectral distributions of $Eux(\lambda)$, $Euy(\lambda)$ and $Euz(\lambda)$ are all weak. That is to say, the cutoff wavelengths of the six kinds of color filters 31 to 36 are set in wavelength regions in which $Eux(\lambda)$<thx1, $Euy(\lambda)$<thy1, and $Euz(\lambda)$<thz1. As will be described in detail later, appropriately setting thx1, thy1 and thz1 on the basis of experience prevents a shift of the spectral transmittance characteristics of the color filters 31 to 36 from affecting the spectral distributions of the lights after color separation.

The spectral transmittance characteristics $f3j(\lambda)$ of the six color filters 3j used in the color image display of the first preferred embodiment of the invention are determined as described above.

The color disk 2 is rotating while controlled by the control signal from the signal processing unit 105, and so the filter located in the position the light from the super high pressure mercury lamp 1 strikes changes in a time-division manner. Accordingly the light coming from the super high pressure mercury lamp 1 is color-separated into the six-color lights C31 to C36 in a time-division manner at the color filters 31 to 36 of the color disk 2. At this time, the spectral distributions c3j(λ) of the six-color lights C3j color-separated at the six color filters are calculated by the equation (9) below.

$$c3j(\lambda) = Eu(\lambda) \times f3j(\lambda) \qquad \text{Eq.(9)}$$

The lights color-separated into the six-color lights C31 to C36 in a time-division manner at the color filters 31 to 36 of the color disk 2 impinge upon the light valve 103. The six-color lights C31 to C36 incident upon the light valve 103 are modulated in the light valve 103 according to the control signal from the signal processing unit 105 and projected onto the screen 104.

Figure 4:
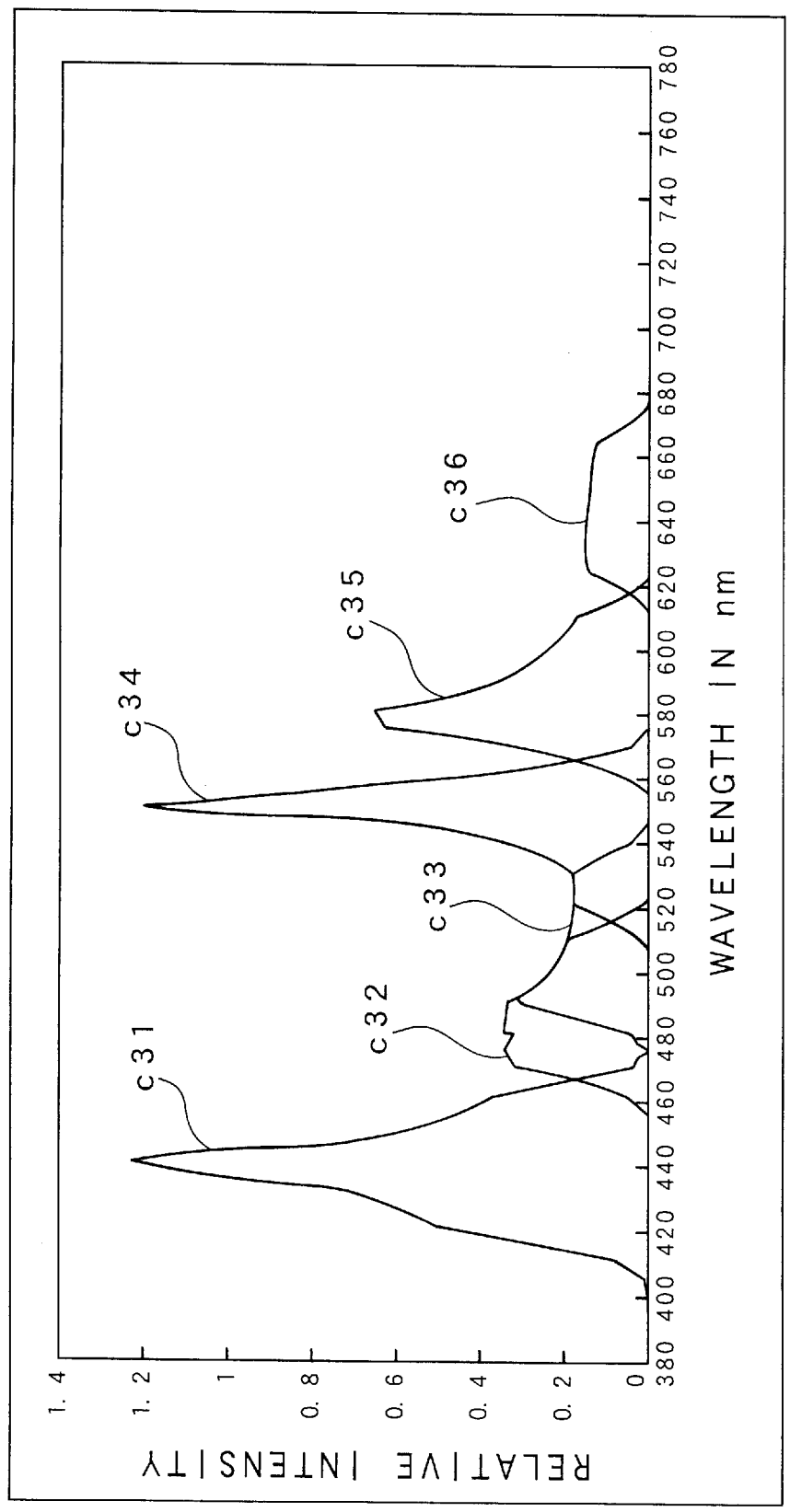
FIG. 4 is a diagram showing spectral distributions of lights of six colors color-separated by the color filters in the image display of the first preferred embodiment of the invention.

FIG. 4 shows the spectral distributions c3j(λ) of the six-color lights C3j color-separated at the color filters 3j. In FIG. 4, the vertical axis shows the relative intensity of the color-separated lights and the horizontal axis shows the wavelength.

Figure 24:
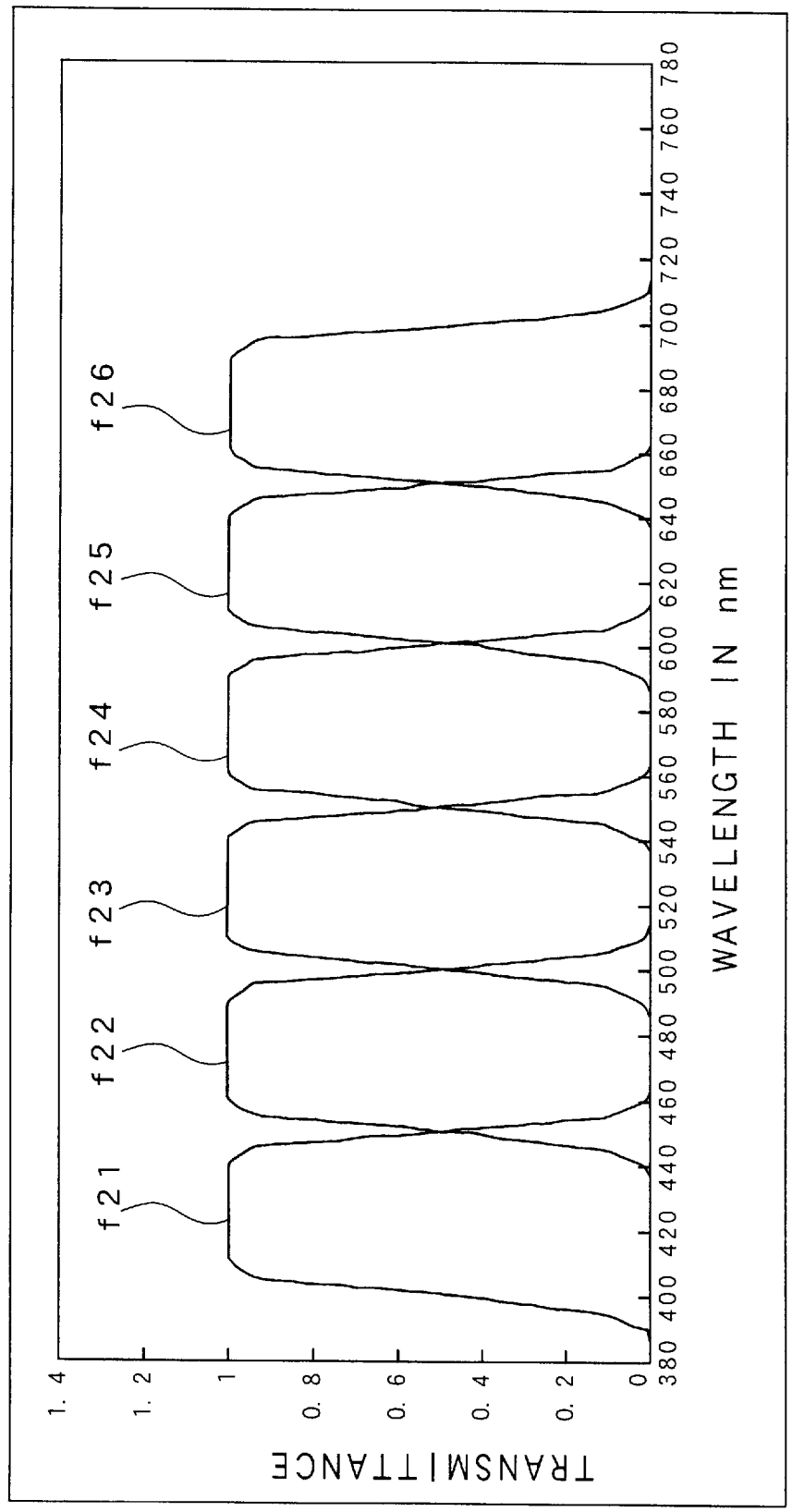
FIG. 24 is a diagram showing an example of spectral transmittance characteristics of six color filters used in a conventional image display.
Figure 25:
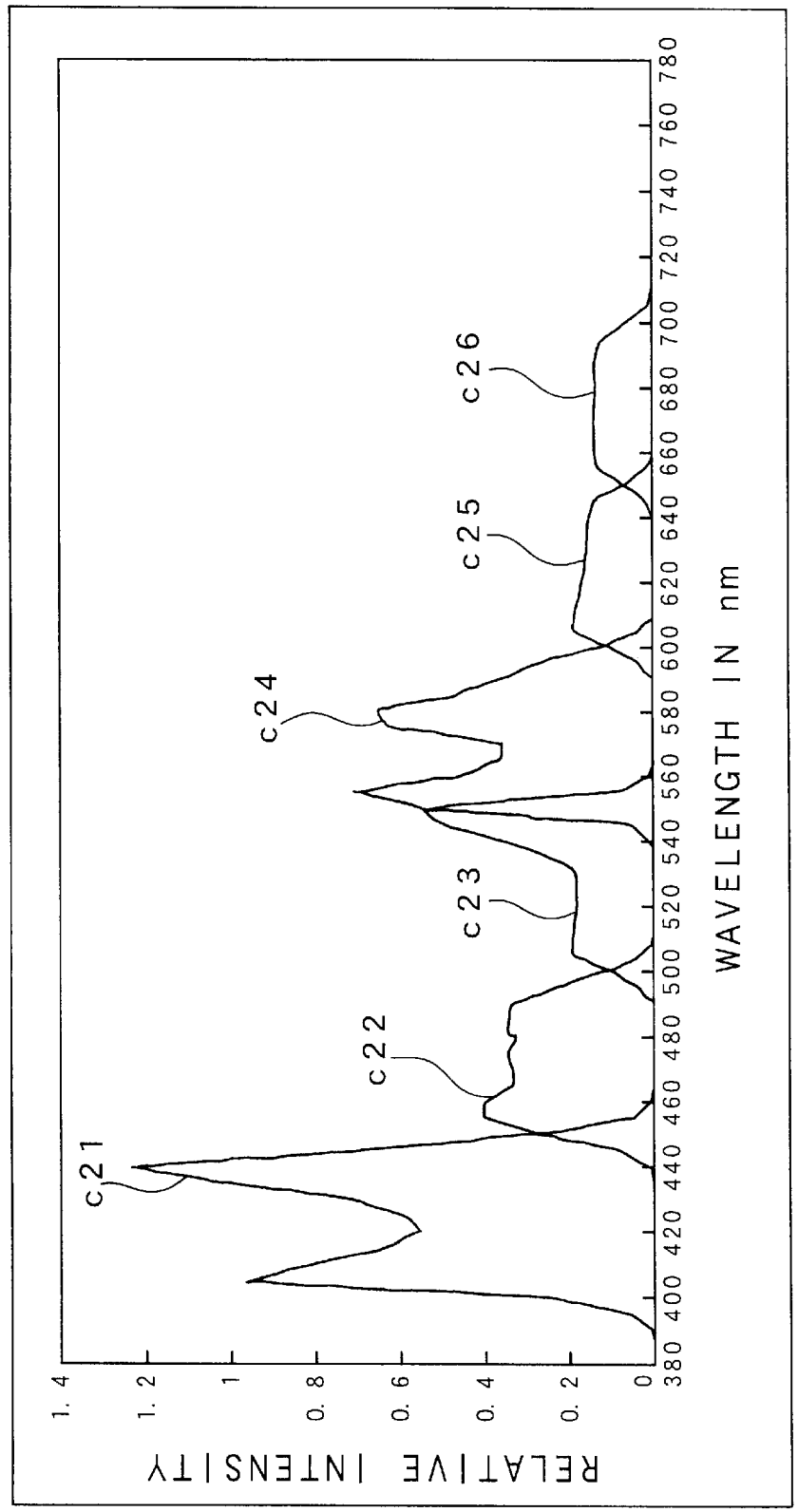
FIG. 25 is a diagram showing the spectral distribution characteristics of six-color lights color-separated through the six color filters in the conventional image display.
Figure 26:
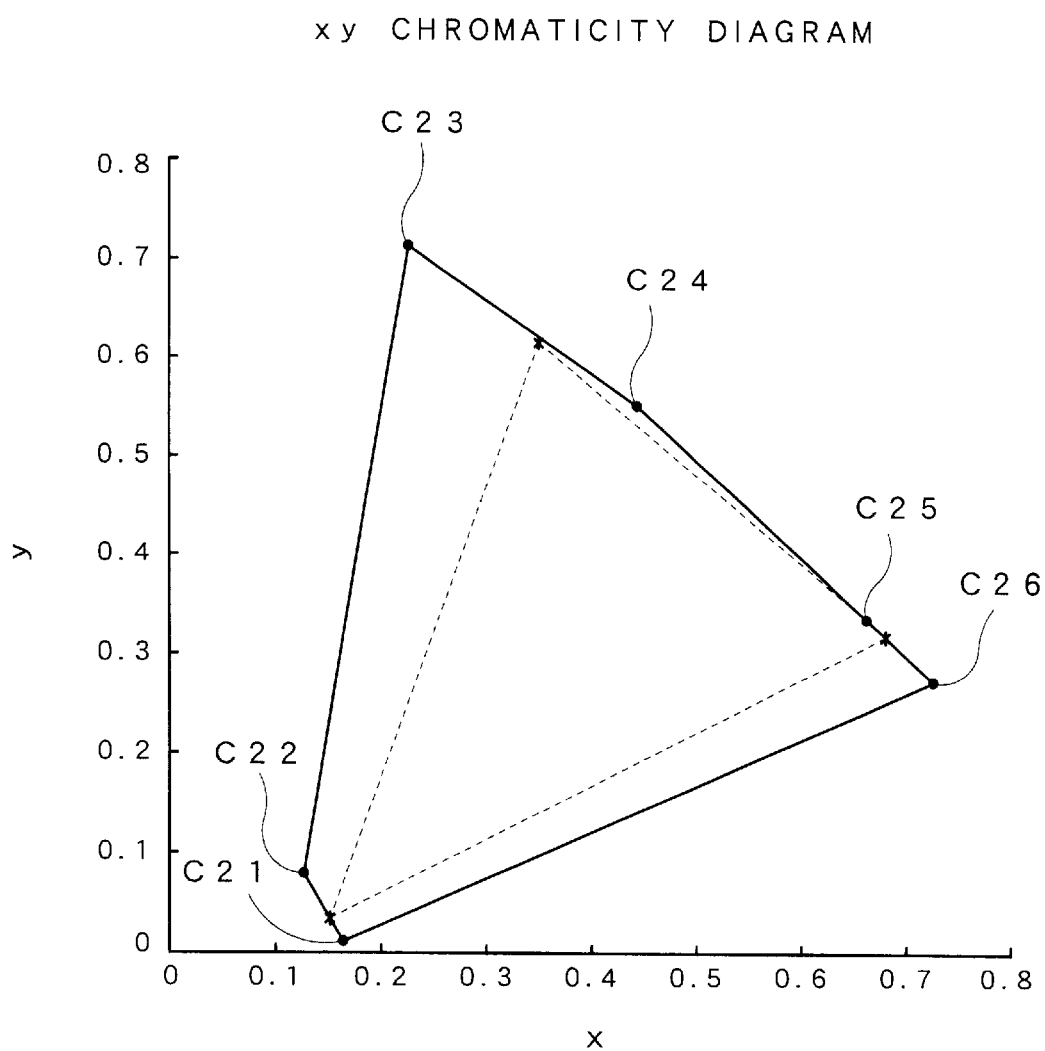
FIG. 26 is a diagram showing the six-color lights color-separated through the six color filters in the conventional image display on a chromaticity diagram.

FIG. 25 shows the spectral distributions c2j(λ) of the six-color lights C2j obtained by color-separating the light from the super high pressure mercury lamp through six kinds of color filters having such spectral transmittance characteristics shown in FIG. 24 which almost equally divide the wavelength region of 400 to 700 nm into six. As compared with the spectral distributions c2j(λ) shown in FIG. 25, the spectral distributions c3j(λ) shown in FIG. 4 well transmit the intensive radiation in the vicinity of the wavelength 550 nm of the super high pressure mercury lamp.

Figure 5:
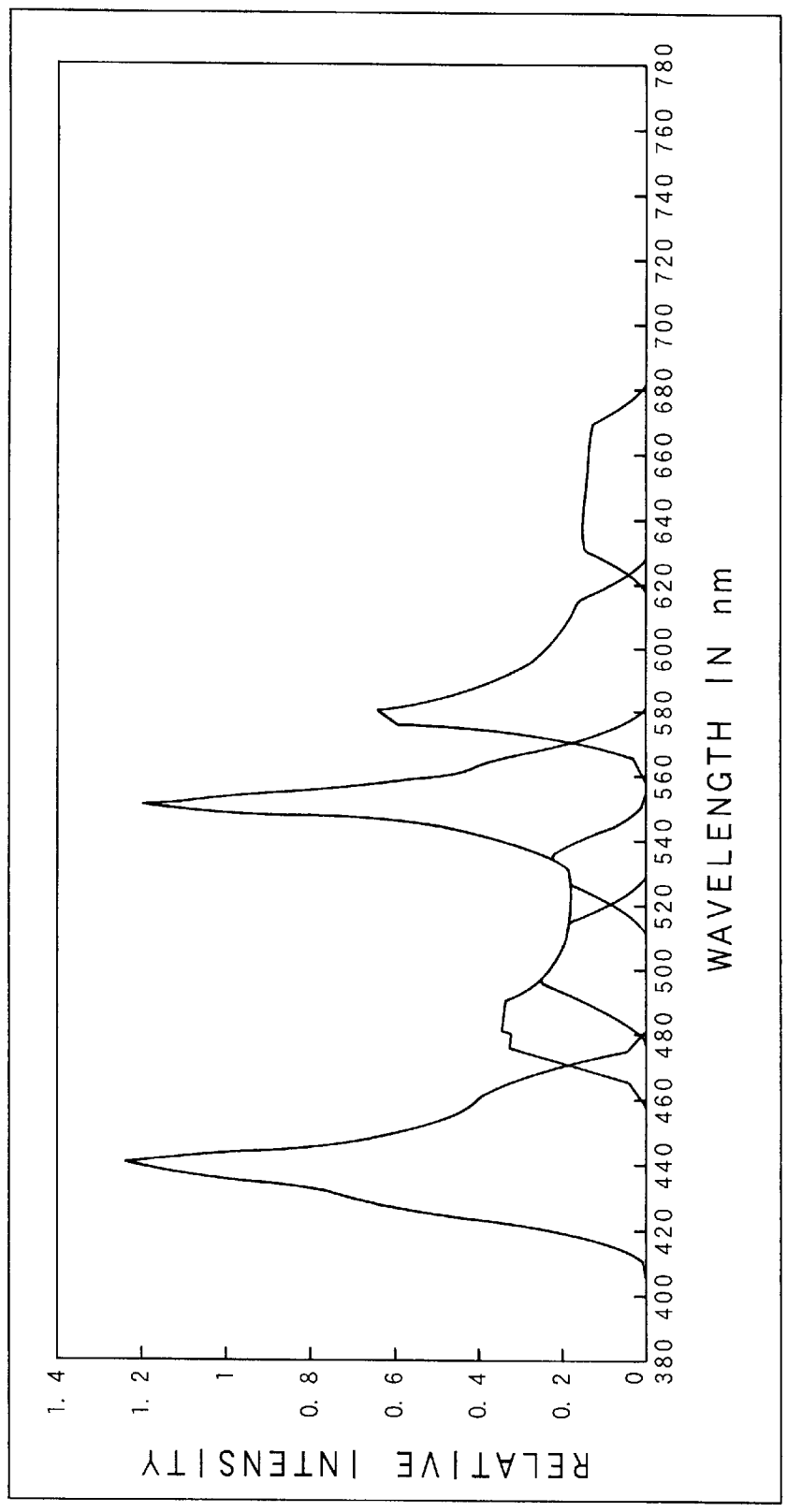
FIG. 5 is a diagram showing the spectral distributions of the six-color lights color-separated when the spectral transmittance characteristics of the color filters shift by 5 nm to longer wavelengths in the image display of the first preferred embodiment of the invention.
Figure 6:
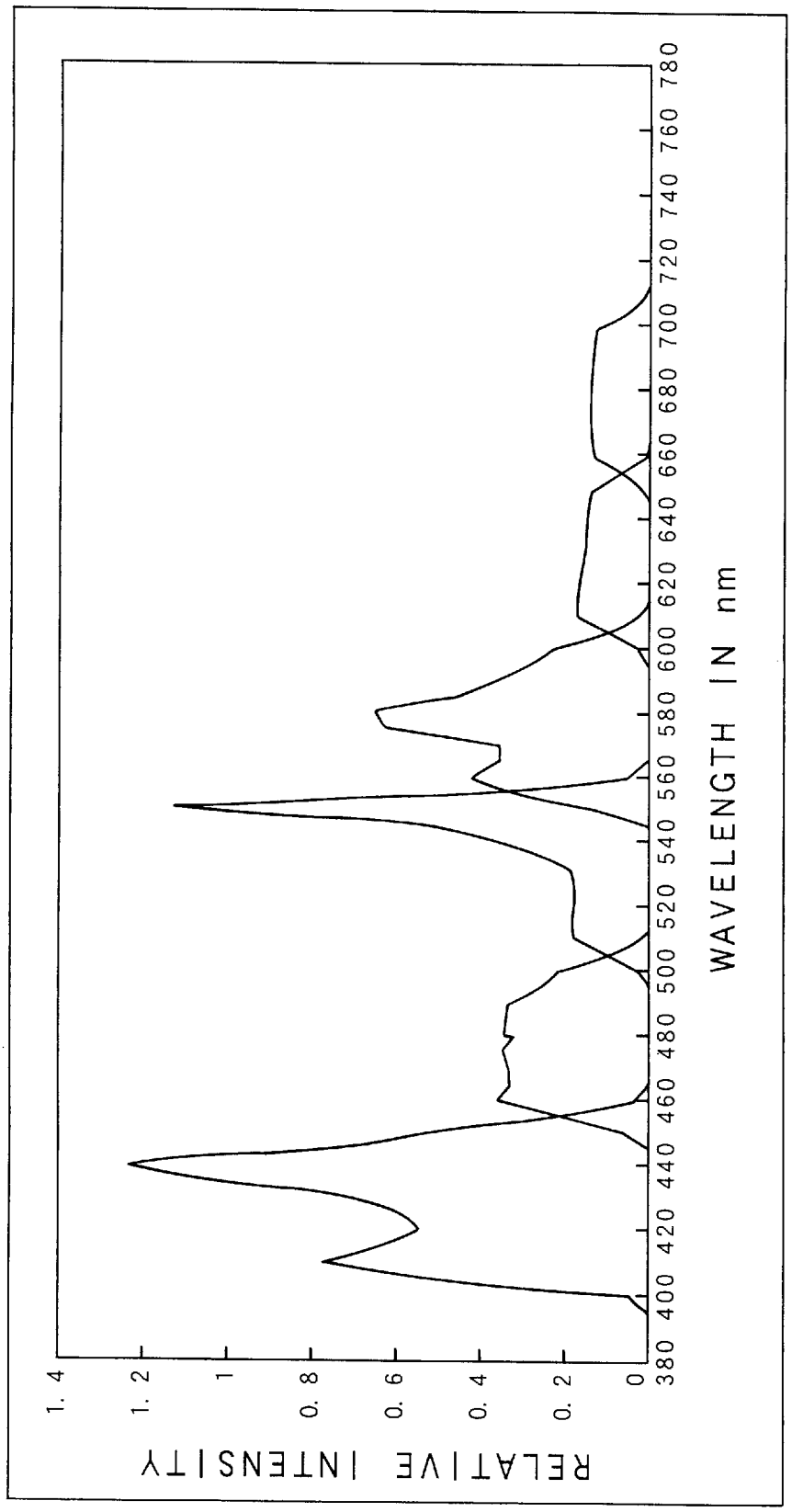
FIG. 6 is a diagram showing the spectral distributions of six-color lights obtained by color-separating the light from the super high pressure mercury lamp when the spectral transmittance characteristics of color filters that almost equally divide the wavelength region of 400 to 700 nm into six are shifted by 5 nm to longer wavelengths.

FIG. 5 shows the spectral distributions of the six-color lights color-separated when the spectral transmittance characteristics of the color filters 31 to 36 of this preferred embodiment shown in FIG. 2 are shifted by 5 nm to longer wavelengths. FIG. 6 shows the spectral distributions of the six-color lights color-separated when the spectral transmittance characteristics shown in FIG. 24 that almost equally divide the wavelength region of 400 to 700 nm into six are shifted by 5 nm to longer wavelengths. From FIGS. 4 and 5 and FIGS. 25 and 6, it is seen that the color filters 31 to 36 of this preferred embodiment alleviate the effect of the shift of the spectral transmittance characteristics on the spectral distributions of the lights after color separation.

While the image display of this preferred embodiment is realized by the time-division color projection system, it may be realized by the simultaneous color projection system. The spectral transmittance characteristics shown in FIG. 2 are an example of spectral transmission characteristics of the filters used for color separation. The number of kinds of the filters used in color separation is not limited to six.

Second Preferred Embodiment

Figure 7:
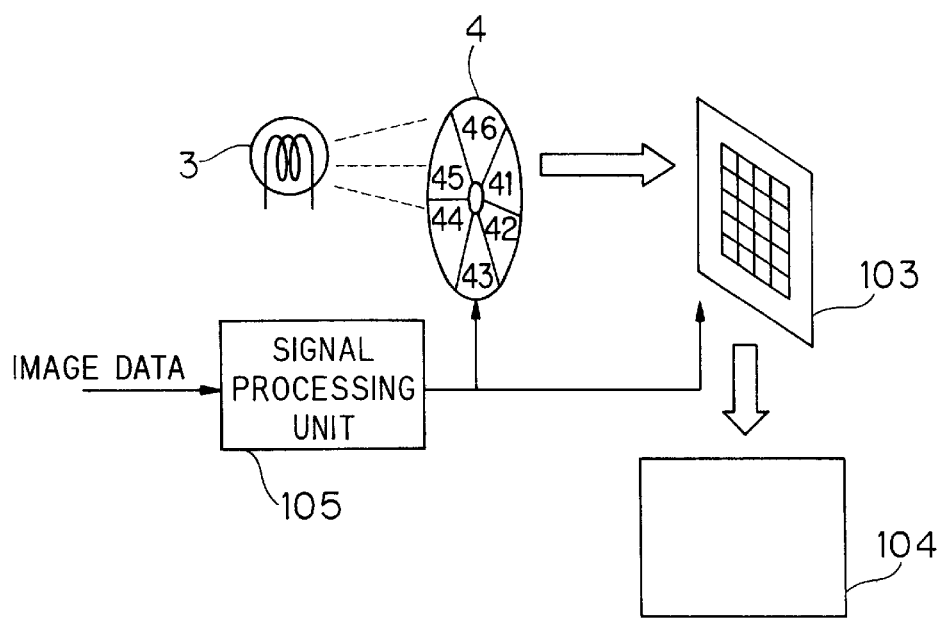
FIG. 7 is a block diagram showing an example of structure of an image display according to a second preferred embodiment of the present invention.

FIG. 7 is a block diagram showing an example of structure of an image display of a second preferred embodiment of the invention. As shown in FIG. 7, the image display has a metal halide lamp 3, a color disk 4, a light valve 103, a screen 104, and a signal processing unit 105. The image display of FIG. 7 reproduces a color image by projecting lights separated into six colors C41, C42, C43, C44, C45 and C46 by the color filters 41, 42, 43, 44, 45, and 46 of the color disk 4.

The operation of the image display of FIG. 7 will now be described. Image data is inputted to the signal processing unit 105. The signal processing unit 105 generates control signals for the color disk 4 and the light valve 103 from the input image data and supplies the control signals to the color disk 4 and the light valve 103.

Figure 8:
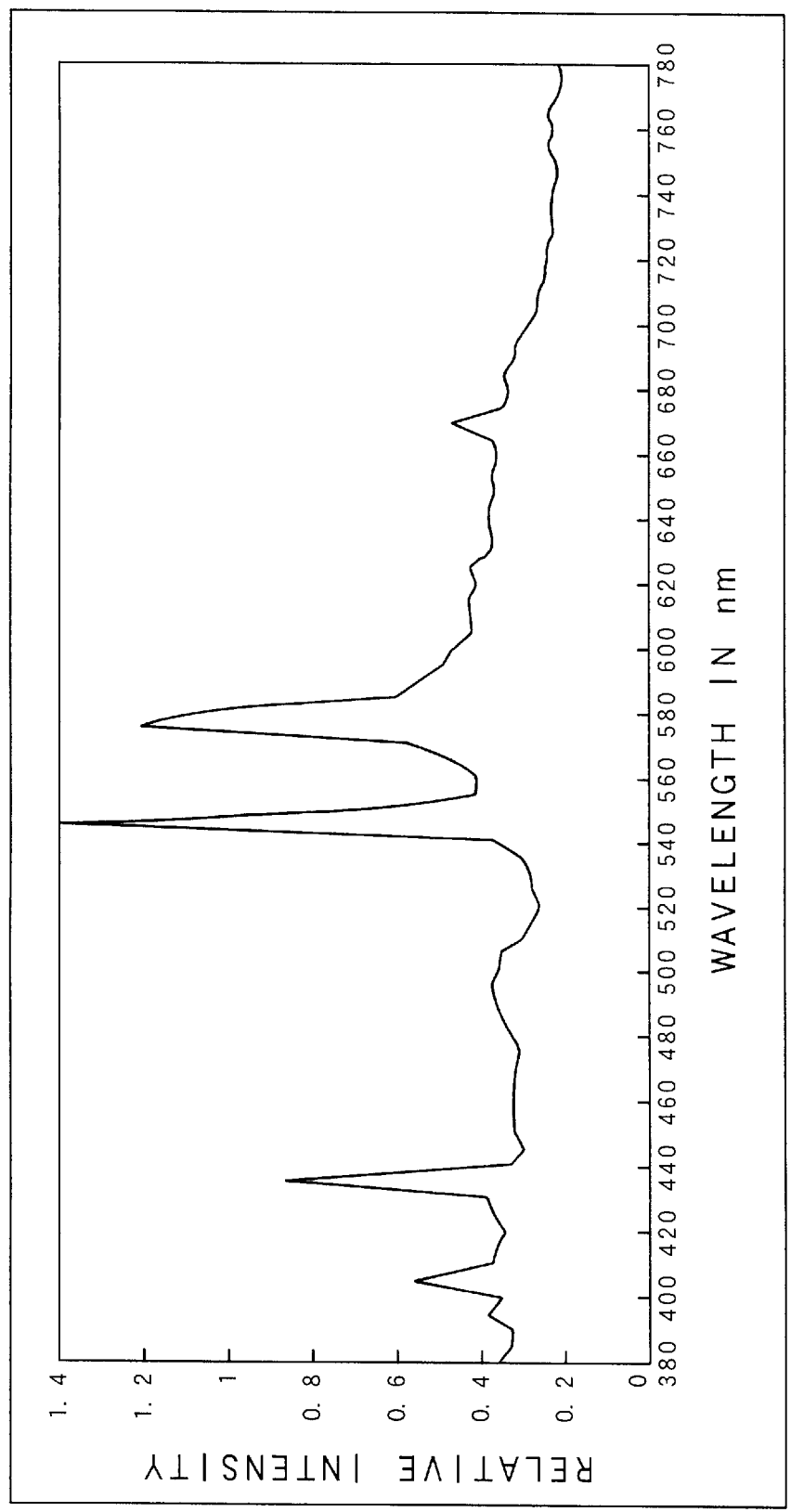
FIG. 8 is a diagram showing an example of the spectral emissivity of light emitted from a metal halide lamp.

The light emitted from the metal halide lamp 3 impinges upon part of the color disk 4. FIG. 8 shows an example of spectral emissivity Em(λ) of the light emitted from the metal halide lamp 3. In FIG. 8, the vertical axis shows the relative intensity of the light emitted from the light source and the horizontal axis shows the wavelength.

Figure 9:
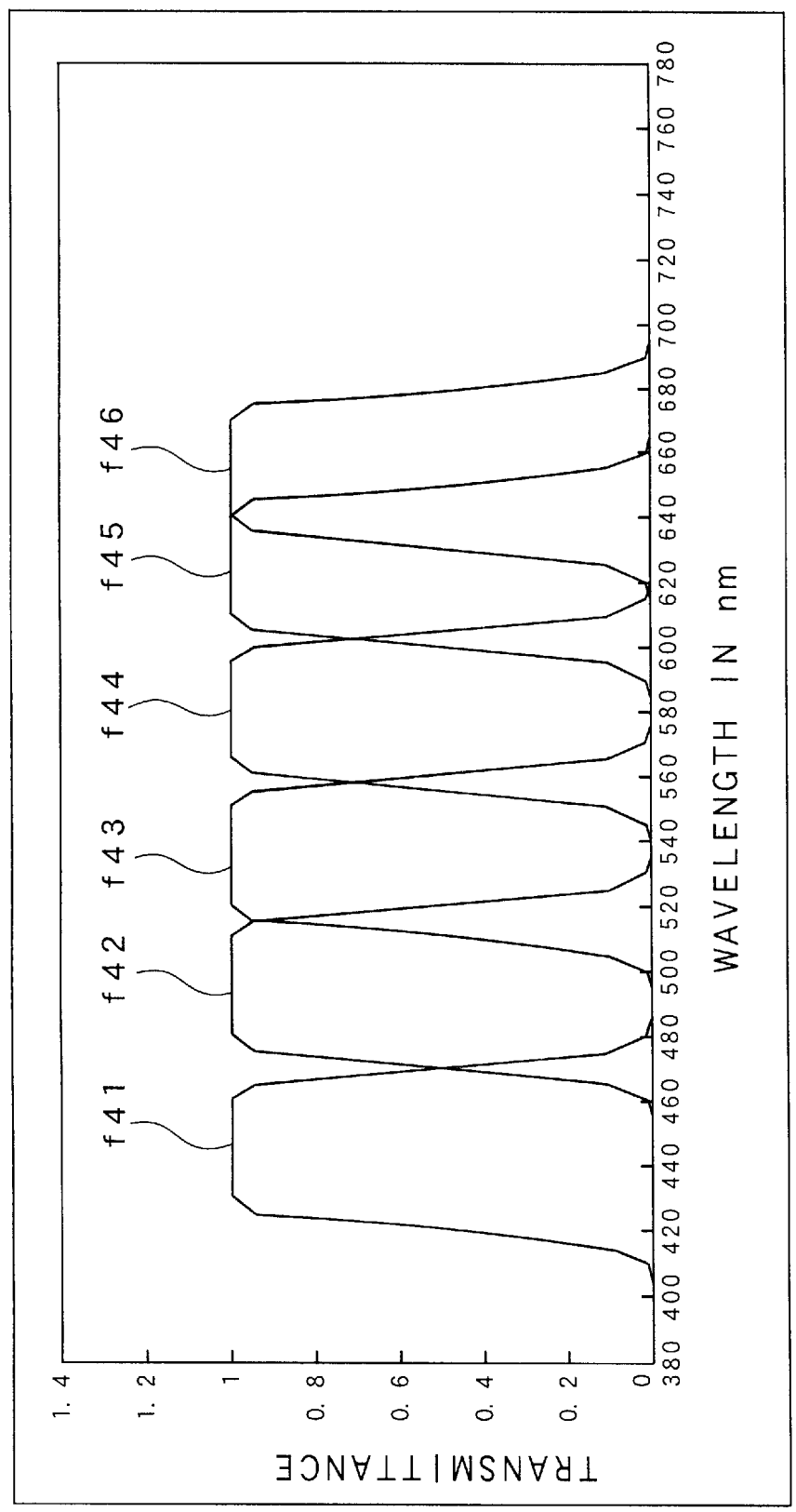
FIG. 9 is a diagram showing an example of spectral transmittance characteristics of six kinds of color filters used in the image display of the second preferred embodiment of the invention.

The color disk 4 is divided into six areas, each area 4j being a color filter having the spectral transmittance characteristic f4j(λ). Where j=1 to 6. FIG. 9 shows an example of the spectral transmittance characteristics f4j(λ) of the six kinds of color filters 4j used in the color image display of the second preferred embodiment of the invention. In FIG. 9, the vertical axis shows the transmittance of the filters and the horizontal axis shows the wavelength.

The spectral transmittance characteristics f4j(λ) of the six kinds of color filters 4j used in the color image display of the second preferred embodiment of the invention are determined as follows.

The spectral emissivity characteristic of the light emitted from the metal halide lamp 3 shown in FIG. 8 has intensive radiations in the vicinities of the four wavelengths 405 nm, 435 nm, 545 nm, and 575 nm. Human eyes have highly sensitive wavelength region and less sensitive wavelength region. Considering this visual characteristic of human eyes, the spectral emissivity does not have to be equally handled in all wavelength regions of the light emitted from the light source. Accordingly, when determining the spectral transmittance characteristics of the color filters, the visual characteristic of human eyes is taken into consideration as well as the spectral emissivity characteristic of the light emitted from the metal halide lamp.

Figure 10A:
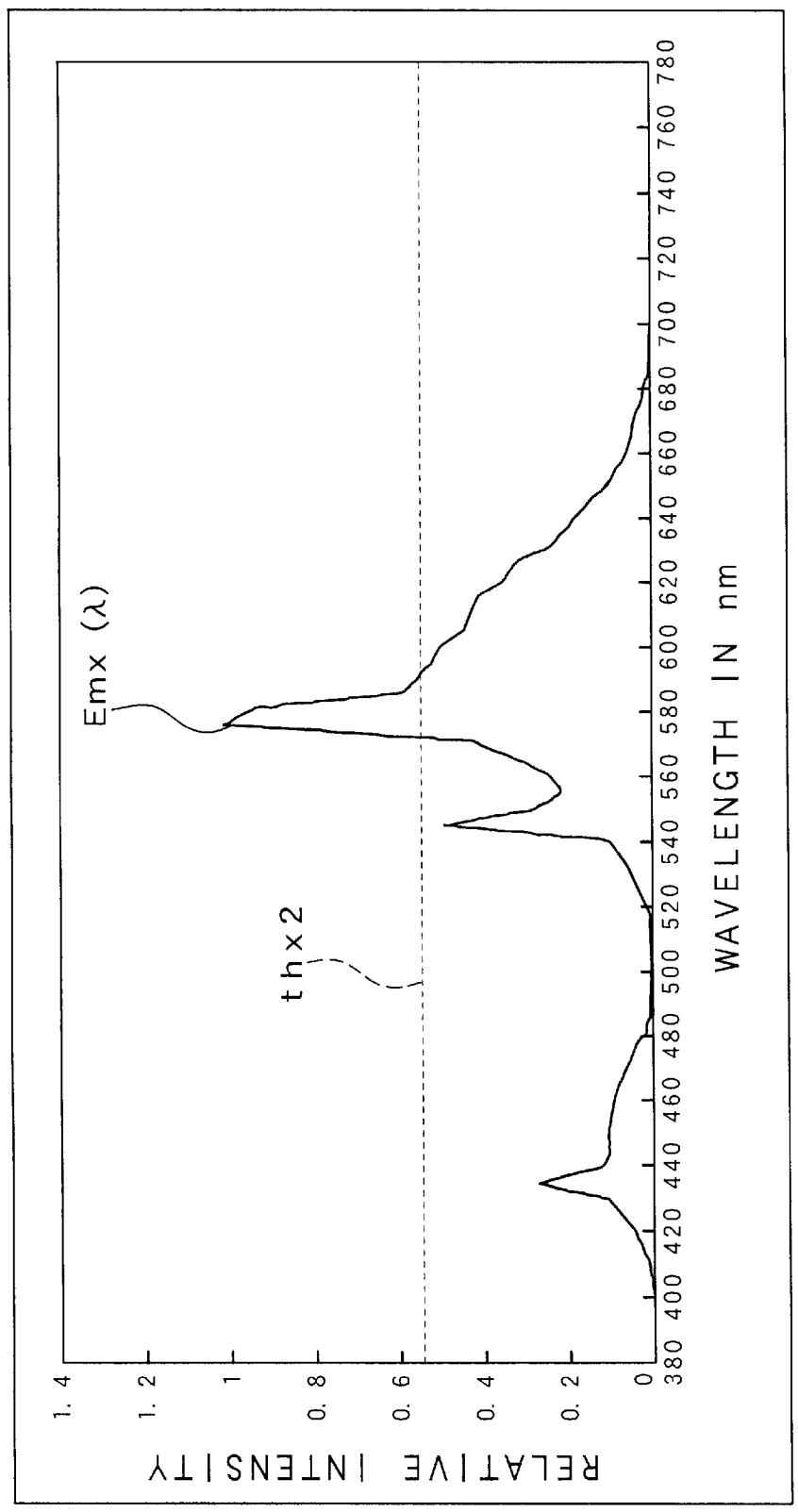
FIGS. 10A to 10C are diagrams showing the spectral distribution characteristics obtained by multiplying the spectral emissivity of the light from the metal halide lamp by color matching functions.
Figure 10B:
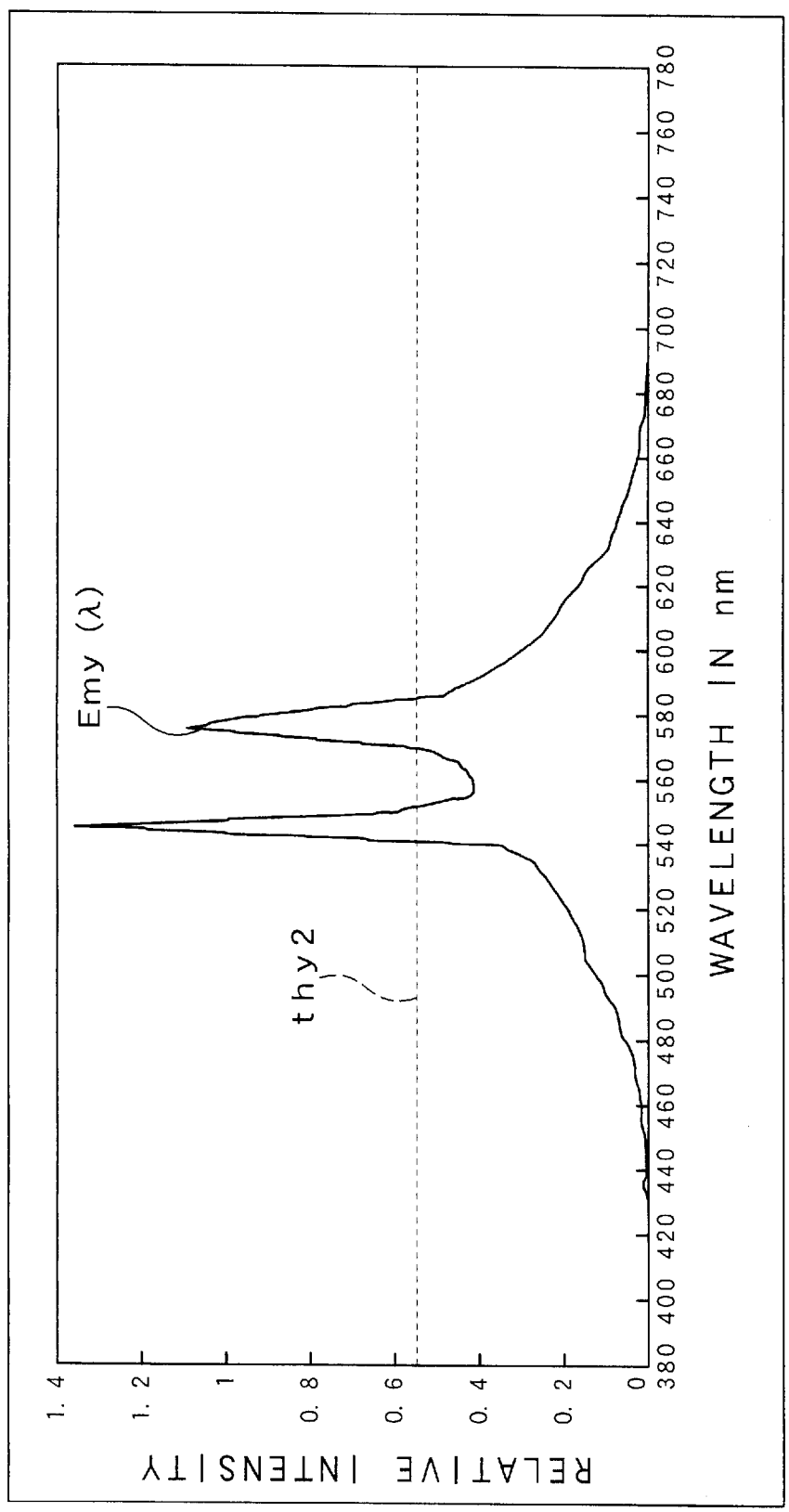
Figure 10C:
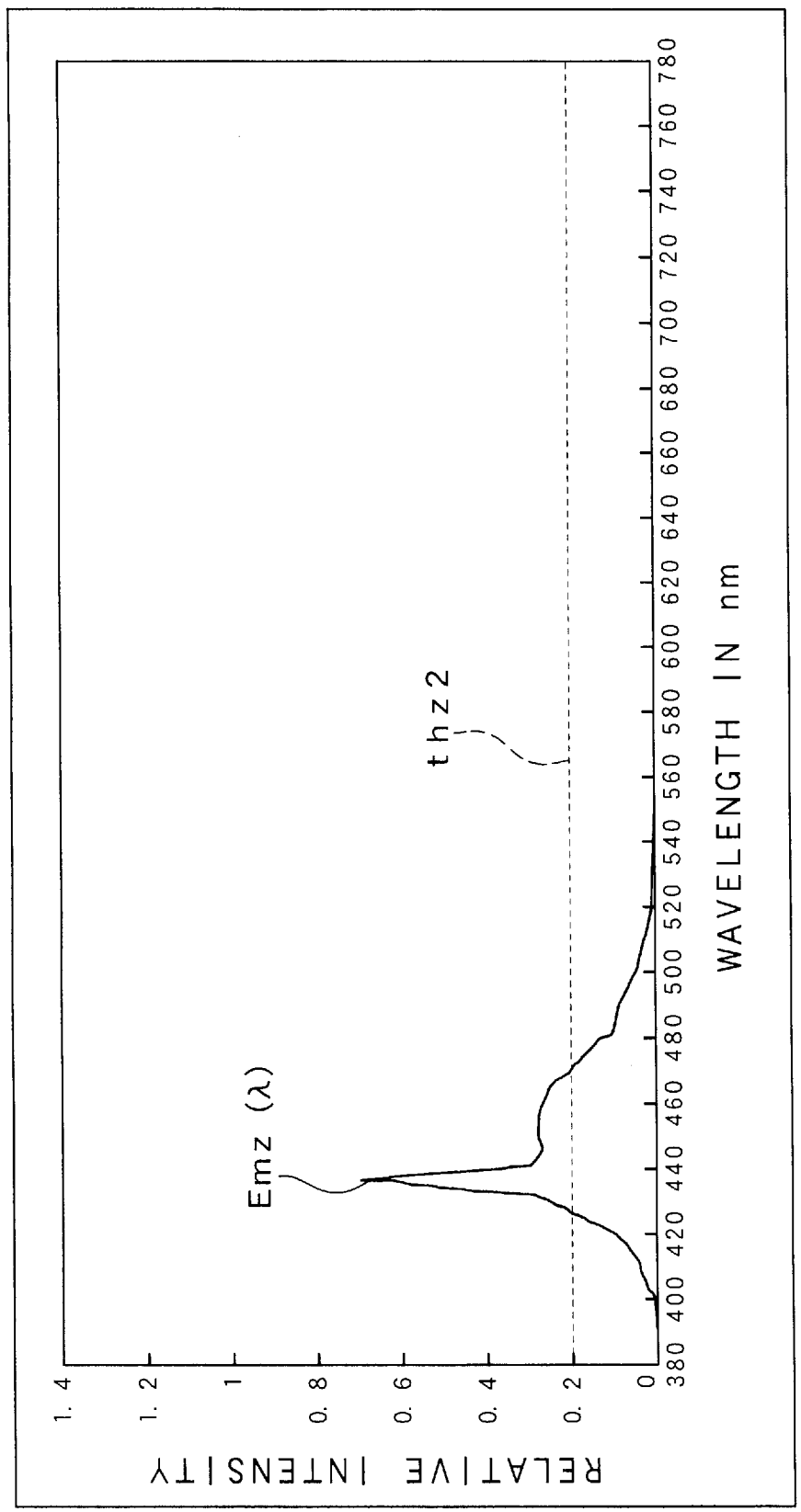

The solid lines in FIGS. 10A to 10C show the spectral distribution characteristics Emx(λ), Emy(λ) and Emz(λ), which are obtained by multiplying the spectral emissivity Em(λ) of the light emitted from the metal halide lamp 3 by the color matching functions $\bar{x}(\lambda)$, $\bar{y}(\lambda)$, and $\bar{z}(\lambda)$. The broken lines in FIGS. 10A to 10C show the values of thx2, thy2, thz2 obtained by the calculation of equation (10).

$$thx2 = 4 \times \int_{380}^{780} Em(\lambda) \times \bar{x}(\lambda) d\lambda / (780 - 380) \qquad \text{Eq.(10)}$$

$$thy2 = 4 \times \int_{380}^{780} Em(\lambda) \times \bar{y}(\lambda) d\lambda / (780 - 380)$$

$$thz2 = 4 \times \int_{380}^{780} Em(\lambda) \times \bar{z}(\lambda) d\lambda / (780 - 380)$$

The values thx2, thy2, and thz2 given by the equation (10) are four times the average values of Emx(λ), Emy(λ), and Emz(λ) in the wavelength range of 380 to 780 nm. In FIGS. 10A to 10C, the wavelengths at which Emx(λ), Emy(λ) and Emz(λ) are respectively larger than thx2, thy2 and thz2 are determined to be wavelengths at which the spectral distribution of Emx(λ), Emy(λ), or Emz(λ) is strong, and the wavelengths other than the strong spectral distribution wavelengths are determined to be wavelengths at which the spectral distributions are weak.

From FIGS. 10A to 10C, it is seen that the spectral distribution is strong in the wavelength range of 430 to 470 nm and in the vicinities of the wavelengths 545 and 575 nm in Emx(λ), Emy(λ), or Emz(λ). The spectral transmittance characteristics f4j(λ) of the six kinds of color filters 4j are determined by considering the wavelengths at which the spectral distribution is strong. Effectively utilizing the light energy from the metal halide lamp 3 requires that the wavelength regions of the strong spectral distributions be completely included in the transmission wavelength regions of the six kinds of color filters.

To alleviate the effect that a slight shift of the spectral transmittance characteristics of the color filters exerts on the spectral distributions of the lights after color-separated, it is preferred that the cutoff wavelengths of the six kinds of color filters are in the wavelength regions in which the spectral distributions are weak.

Similarly to those in the first preferred embodiment, the spectral transmittance characteristics f4j(λ) of the six kinds of color filters 4j are determined so that the wavelength regions in which the spectral distributions are strong in the wavelength range of 430 to 470 nm and in the vicinities of the wavelengths 545 nm and 575 nm in the spectral distribution characteristics shown in FIGS. 10A to 10C are completely included in the transmission wavelength regions of the six kinds of color filters 41 to 46. Also similarly to those in the first preferred embodiment, the cutoff wavelengths of the six kinds of color filters are set in wavelength regions in which the spectral distributions of Emx(λ), Emy(λ) and Emz(λ) are all weak. That is to say, the cutoff wavelengths of the six kinds of color filters 41 to 46 are set in wavelength regions in which Emx(λ)<thx2, Emy(λ)<thy2, and Emz(λ)<thz2.

The spectral transmittance characteristics f4j(λ) of the six color filters used in the color image display of the second preferred embodiment of the invention are determined as described above.

The color disk 4 is rotating while controlled by the control signal from the signal processing unit 105, and so the filter located in the position the light from the metal halide lamp 3 strikes changes in a time-division manner. Accordingly the light coming from the metal halide lamp 3 is color-separated into the six-color lights C41 to C46 in a time-division manner at the color filters 41 to 46 of the color disk 2. At this time, the spectral distributions c4j(λ) of the six-color lights C4j color-separated at the six color filters are calculated by the equation (11) below.

$$c4j(\lambda)=Em(\lambda) \times f4j(\lambda) \qquad \text{Eq.}(11)$$

The lights color-separated into the six colors C41 to C46 in a time-division manner at the color filters 41 to 46 of the color disk 4 impinge upon the light valve 103. The six-color lights C41 to C46 incident upon the light valve 103 are modulated in the light valve 103 according to the control signal from the signal processing unit 105 and projected onto the screen 104.

Figure 11:
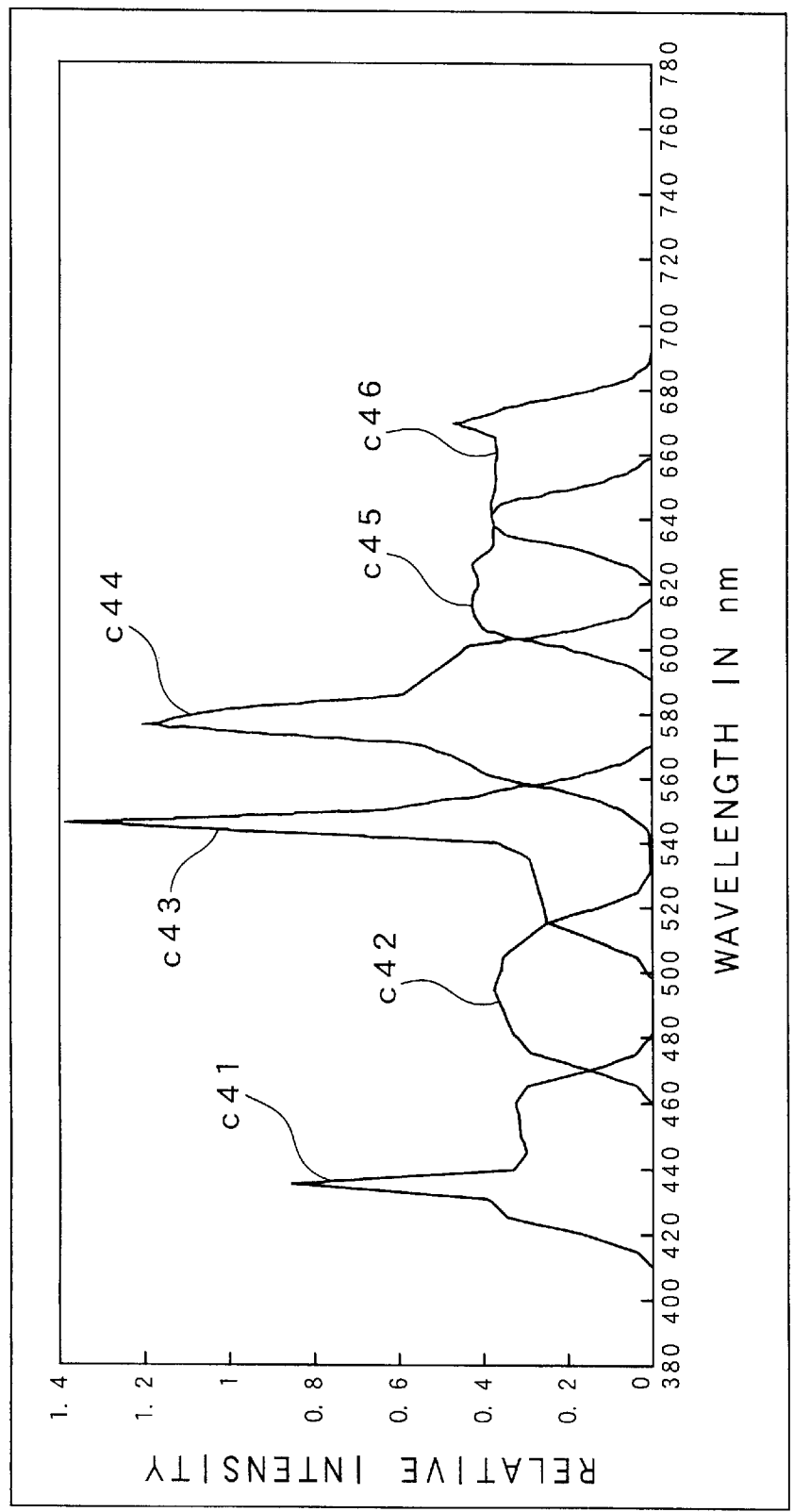
FIG. 11 is a diagram showing the spectral distributions of the six-color lights color-separated by the color filters in the image display of the second preferred embodiment of the invention.

FIG. 11 shows the spectral distributions c4j(λ) of the six-color lights C4j color-separated at the color filters 4j. In FIG. 11, the vertical axis shows the relative intensity of the color-separated lights and the horizontal axis shows the wavelength.

Figure 12:
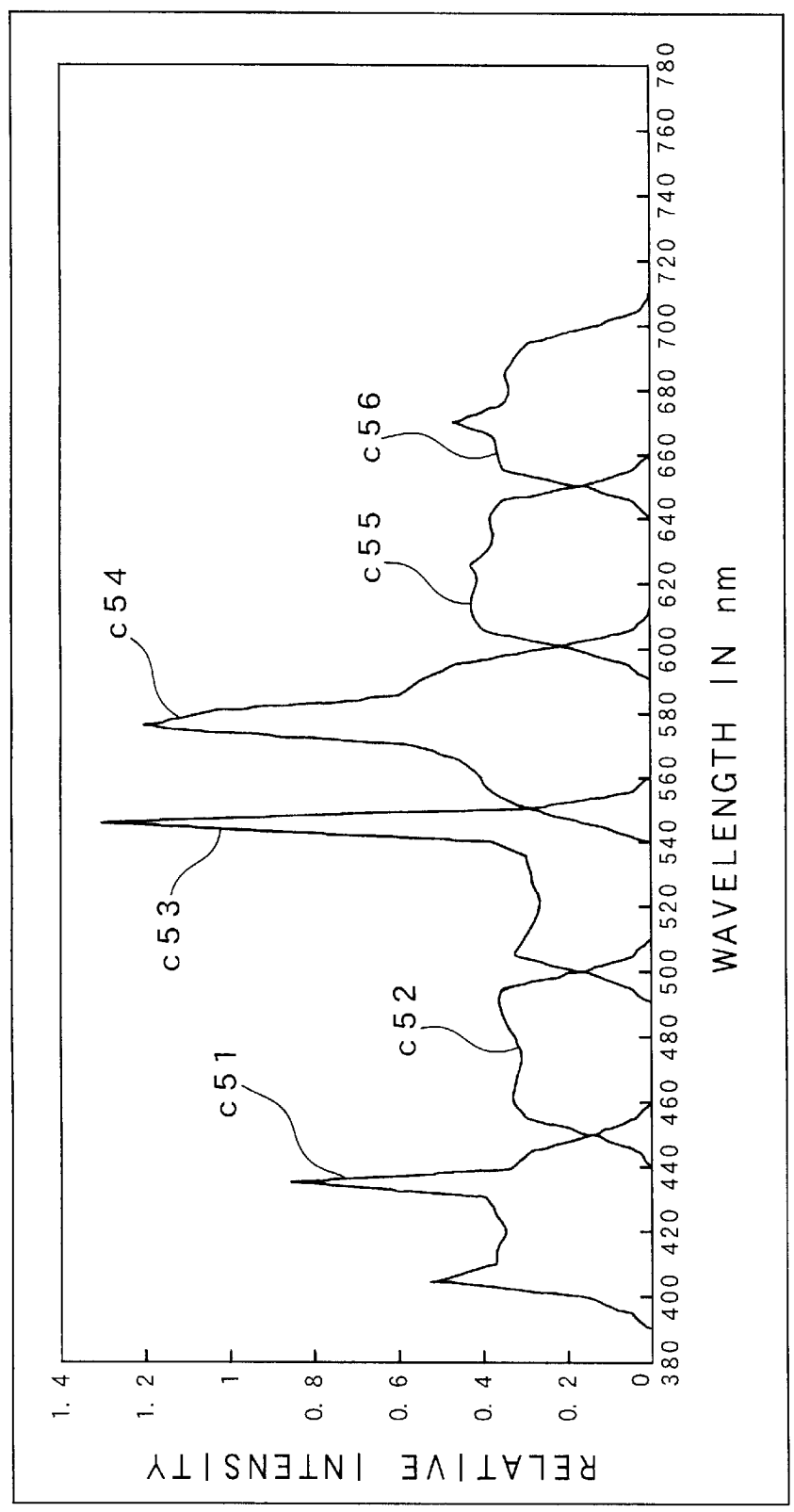
FIG. 12 is a diagram showing the spectral distributions of six-color lights obtained by color-separating the light from the metal halide lamp through color filters that almost equally divide the wavelength of 400 to 700 nm into six.

FIG. 12 shows the spectral distributions c5j(λ) of the six-color lights C5j obtained by color-separating the light from the metal halide lamp through six kinds of color filters 41 to 46 having such spectral transmittance characteristics shown in FIG. 24 as almost equally divide the wavelength region of 400 to 700 nm into six. As compared with the spectral distributions c5j(λ) shown in FIG. 12, the spectral distributions c4j(λ) shown in FIG. 11 well transmit the intensive radiation in the vicinity of the wavelength 545 nm of the metal halide lamp.

Figure 13:
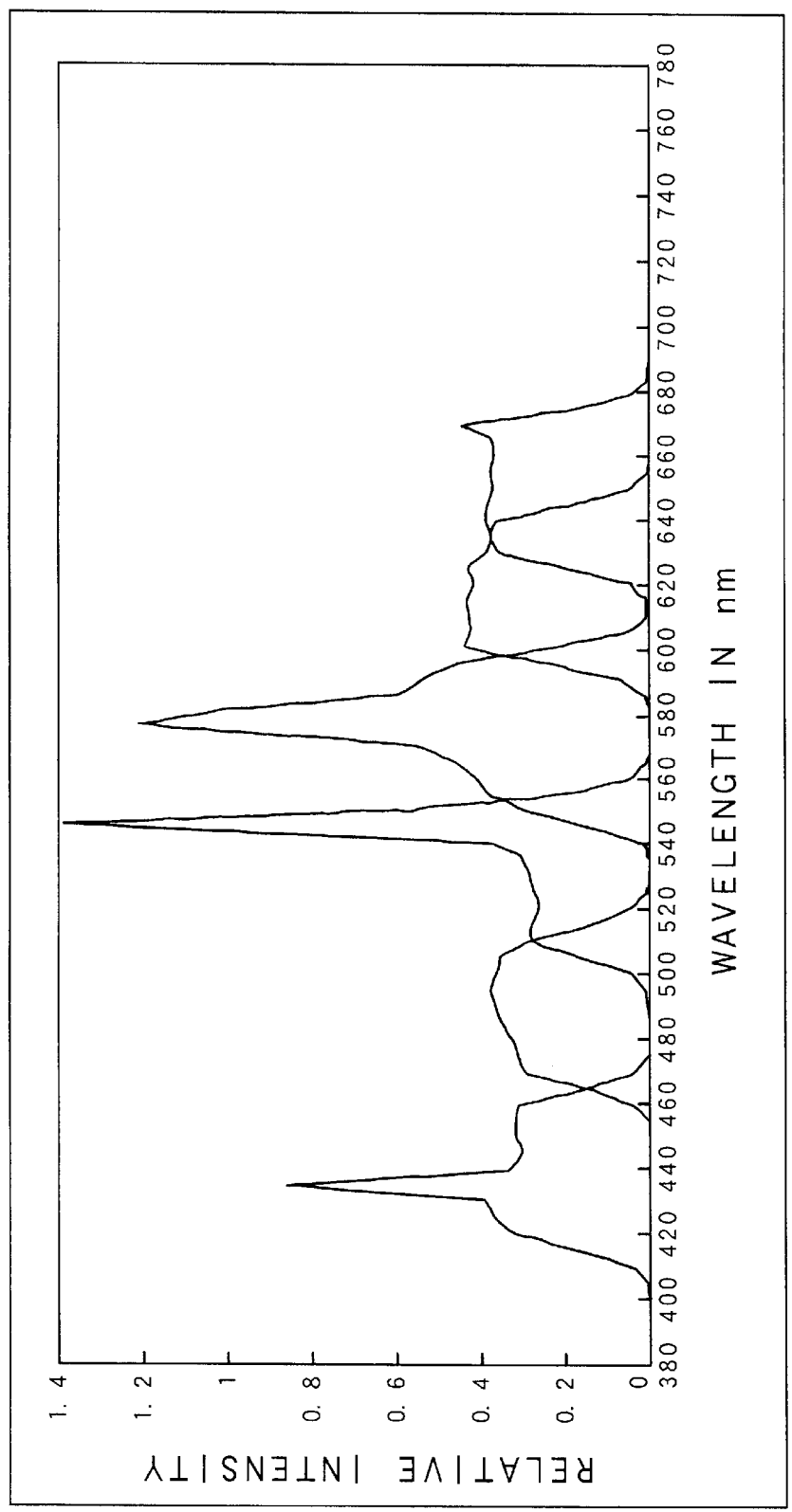
FIG. 13 is a diagram showing the spectral distributions of the six-color lights color-separated when the spectral transmittance characteristics of the color filters are shifted by 5 nm to shorter wavelengths in the image display of the second preferred embodiment of the invention.
Figure 14:
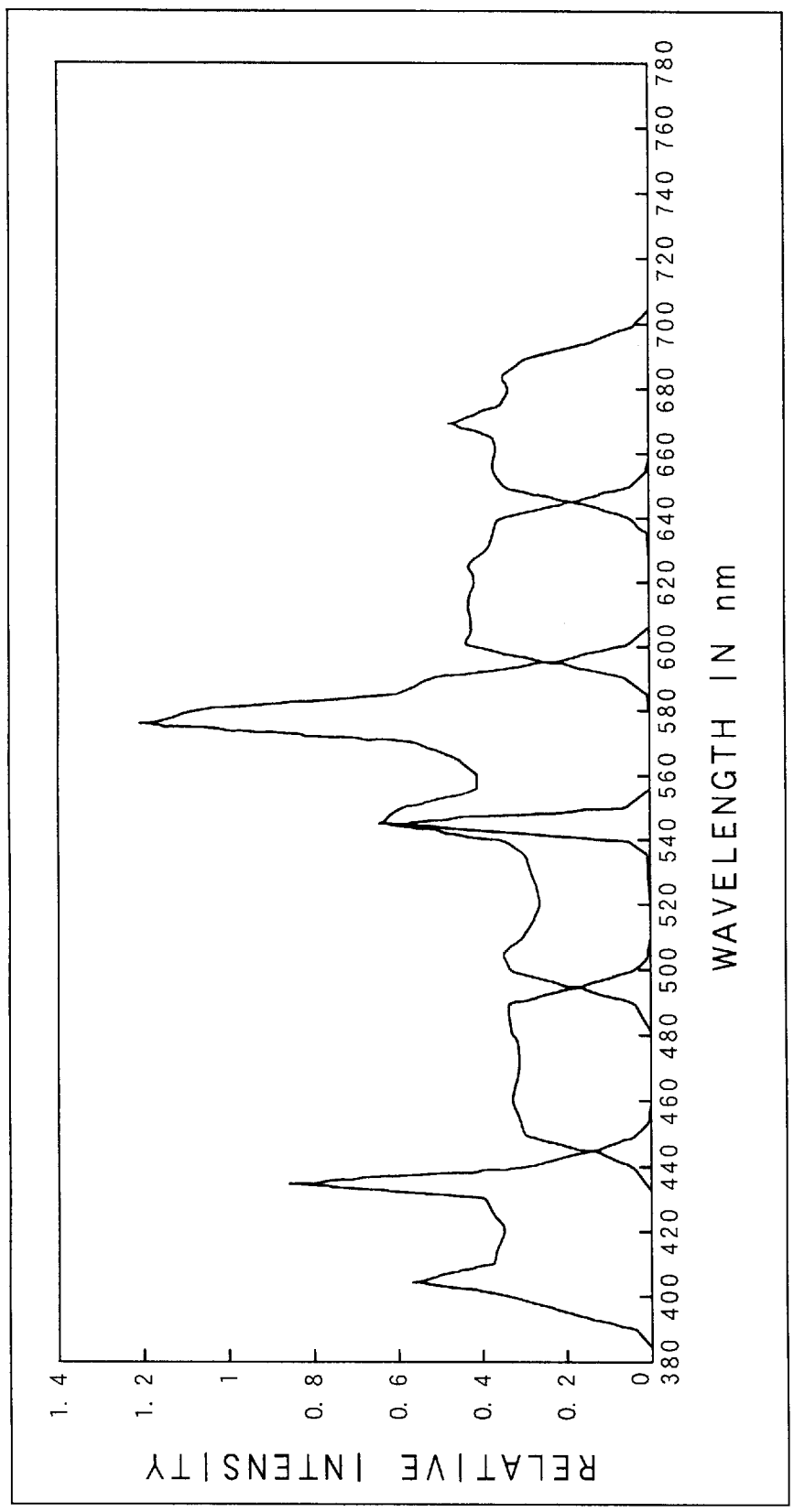
FIG. 14 is a diagram showing the spectral distributions of the six-color lights obtained by color-separating the light from the metal halide lamp when the spectral transmittance characteristics of the color filters that almost equally divide the wavelength region of 400 to 700 nm into six are shifted by 5 nm to shorter wavelengths.
Figure 15:
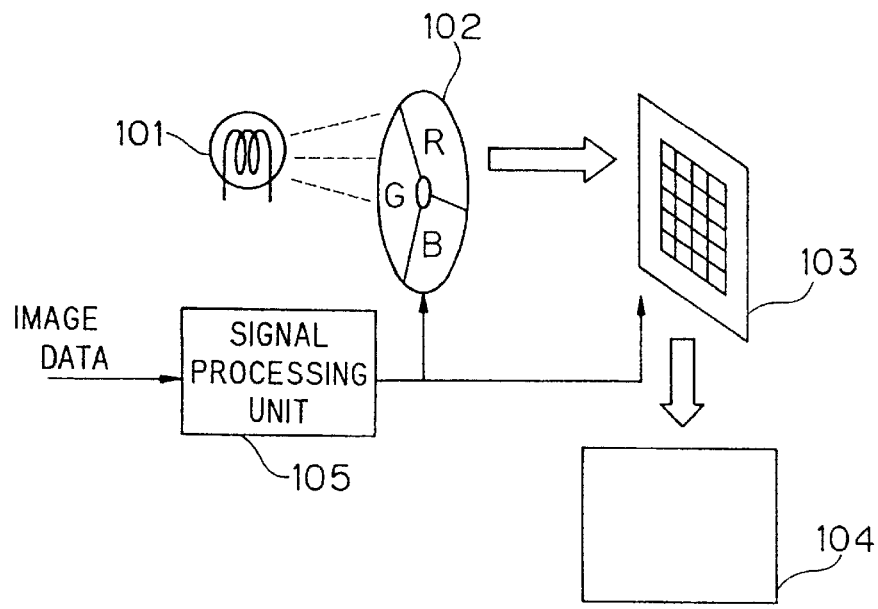
FIG. 15 is a block diagram showing an example of a conventional image display of time-division color projection system using a light valve.
Figure 16:
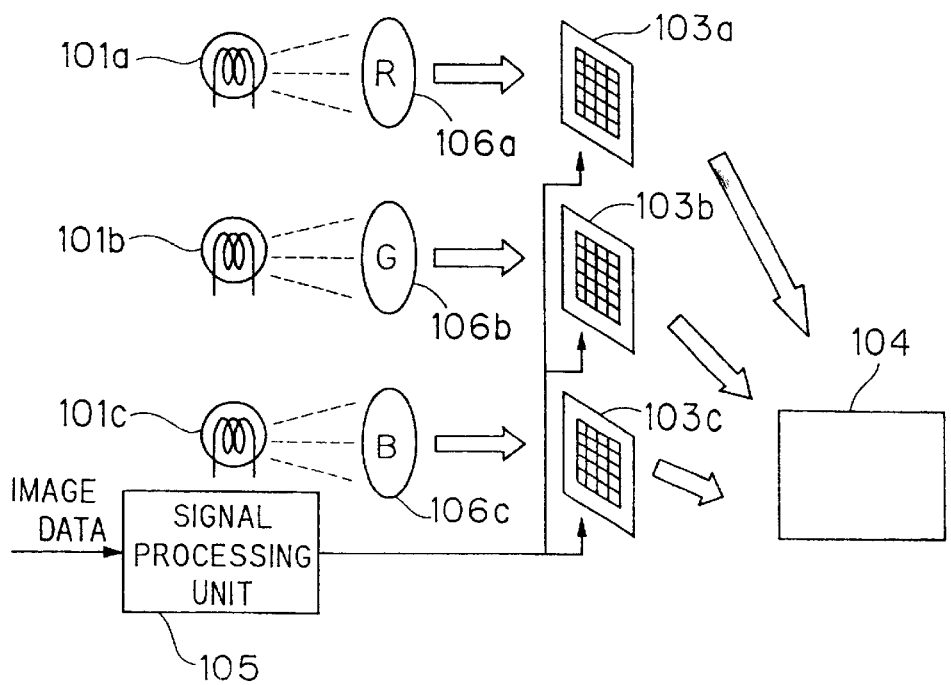
FIG. 16 is a block diagram showing an example of a conventional image display of simultaneous color projection system using a light valve.
Figure 17:
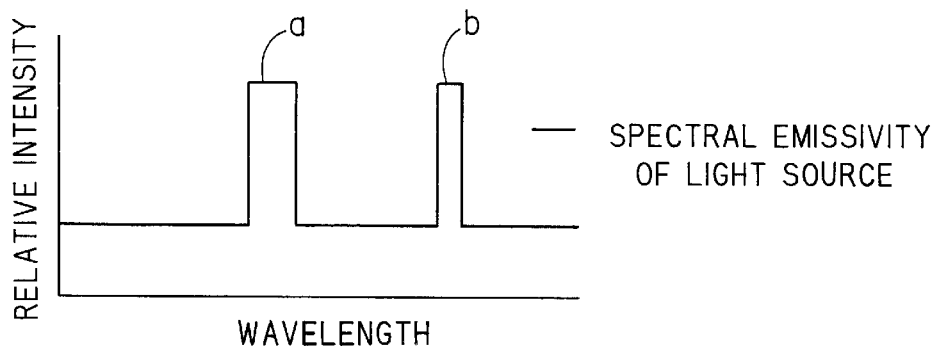
FIG. 17 is a schematic diagram showing the spectral emissivity of an assumed light source.
Figure 18:
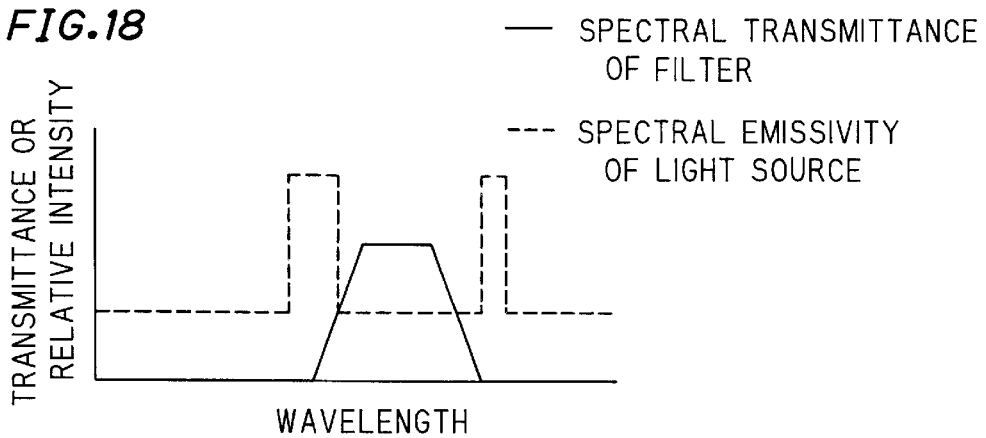
FIG. 18 is a schematic diagram showing the spectral transmittance characteristic of an assumed color filter used in color separation.
Figure 19:
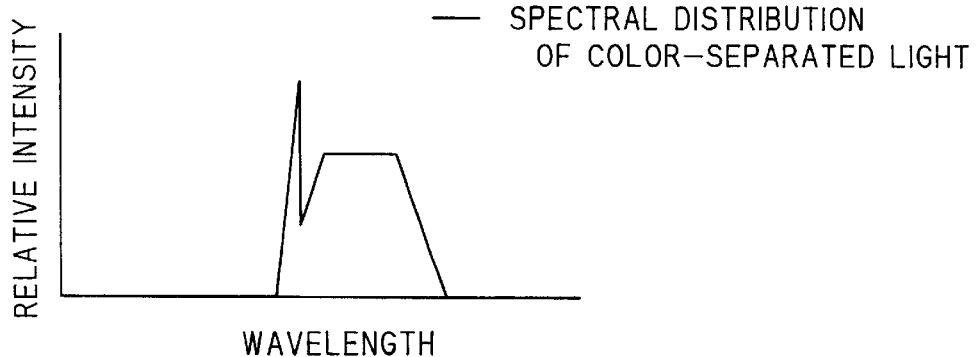
FIG. 19 is a schematic diagram showing the spectral distribution characteristic of light obtained by color-separating the light from the assumed light source through the assumed color filter.

FIG. 13 shows the spectral distributions of the six-color lights color-separated when the spectral transmittance characteristics of the color filters 41 to 46 of this preferred embodiment shown in FIG. 9 are shifted by 5 nm to shorter wavelengths. FIG. 14 shows the spectral distributions of the six-color lights color-separated when the spectral transmittance characteristics shown in FIG. 24 that almost equally divide the wavelength region of 400 to 700 nm into six are shifted by 5 nm to shorter wavelengths. From FIGS. 11 and 13 and FIGS. 12 and 14, it is seen that the color filters 41 to 46 of this preferred embodiment alleviate the effect of the shift of the spectral transmittance characteristics on the spectral distributions of the lights after color separation.

While the image display of this preferred embodiment is realized by the time-division color projection system, it may be realized by the simultaneous color projection system. The spectral transmittance characteristics shown in FIG. 9 are an example of the spectral transmittance characteristics of the filters used for color separation. Further, the number of kinds of the filters used in color separation is not limited to six.

While the invention has been described in detail, the foregoing description is in all aspects illustrative and not restrictive. It is understood that numerous other modifications and variations can be devised without departing from the scope of the invention.

What is claimed is:

1. An image display, comprising:

a light source and a color filter for color-separating light emitted from said light source through said color filter to reproduce a color image by using the color-separated light, wherein said color filter has its cutoff wavelength in a wavelength region in which a spectral distribution obtained by multiplying a spectral emissivity characteristic of the light emitted from said light source by a color matching function is smaller than a predetermined threshold, said predetermined threshold including a value obtained by multiplying an average value of the spectral distribution in a predetermined wavelength region by a constant.

2. The image display according to claim 1, wherein said color filter includes at least four types of color filters.

3. The image display according to claim 1, wherein said predetermined threshold is smaller than the maximum value of the spectral distribution in the predetermined wavelength region.

4. The image display according to claim 3, wherein said predetermined wavelength region includes the wavelength region from 380 nm to 780 nm.

5. The image display according to claim 3, wherein said constant includes an integer.

6. The image display according to claim 1, wherein said light source includes a super high pressure mercury lamp.

7. The image display according to claim 1, wherein said light source includes a metal halide lamp.

8. The image display according to claim 1, wherein said color filter includes a color filter which achieves the color separation by a time-division color projection system.

9. The image display according to claim 1, wherein said color filter includes a color filter which achieves the color separation by a simultaneous color projection system.

10. The image display according to claim 1, wherein said color filter has its transmission wavelength region set to contain a region in which said spectral distribution is equal to or higher than a predetermined intensity.

11. A method for reproducing a color image produced through color filters to compensate for a shift in the spectral transmittance characters of the color filters, comprising the steps of:

inputting image data into a signal processor for generating control signals;

controlling the operation of the color disk and a light valve based on the control signals;

projecting a light through the color disk, the color disk having at least four filters, each having a cutoff wavelength in a wavelength region in which a spectral distribution obtained by multiplying a spectral emissivity characteristic of the light emitted from said light source by a color matching function is smaller than a predetermined threshold, said predetermined threshold including a value obtained by multiplying an average value of the spectral distribution in a predetermined wavelength region by a constant;

modulating the light signals received through the filters by said light valve; and projecting the light signals onto a screen.

\* \* \* \* \*